United States Patent
Padro et al.

(10) Patent No.: US 8,830,015 B2
(45) Date of Patent: Sep. 9, 2014

(54) COMPACT LATCHING MECHANISM FOR SWITCHED ELECTRICAL DEVICE

(75) Inventors: Kenny Padro, Hamden, CT (US); Gaetano Bonasia, Bronx, NY (US)

(73) Assignee: Hubbell Incorporated, Shelton, CT (US)

( * ) Notice: Subject to any disclaimer, the term of this patent is extended or adjusted under 35 U.S.C. 154(b) by 9 days.

(21) Appl. No.: 13/422,787

(22) Filed: Mar. 16, 2012

(65) Prior Publication Data

US 2013/0241677 A1    Sep. 19, 2013

(51) Int. Cl.
| | | |
|---|---|---|
| H01H 75/00 | (2006.01) | |
| H01H 73/00 | (2006.01) | |
| H01H 83/06 | (2006.01) | |

(52) U.S. Cl.
USPC .............................................. 335/18; 361/42

(58) Field of Classification Search
USPC ..................... 335/18–27, 186; 361/42, 115
See application file for complete search history.

(56) References Cited

U.S. PATENT DOCUMENTS

| | | |
|---|---|---|
| 727,764 A | 5/1903 | Ellicott et al. |
| 4,157,520 A | 6/1979 | Moates et al. |
| 4,209,762 A | 6/1980 | Samborski et al. |
| 4,521,824 A | 6/1985 | Morris et al. |
| 4,578,732 A | 3/1986 | Draper et al. |
| 4,893,101 A | 1/1990 | Robitaille |
| 4,939,615 A | 7/1990 | Brant et al. |
| 5,173,673 A | 12/1992 | Weigand et al. |
| 5,223,810 A | 6/1993 | Van Haaren |
| 5,510,760 A | 4/1996 | Marcou et al. |
| 5,519,368 A | 5/1996 | Heise et al. |
| 5,563,756 A * | 10/1996 | Ignasiak ........................ 361/42 |
| 5,933,063 A | 8/1999 | Keung et al. |
| 6,040,967 A | 3/2000 | DiSalvo |
| 6,262,871 B1 | 7/2001 | Nemir et al. |
| 6,381,112 B1 | 4/2002 | DiSalvo |
| 6,580,344 B2 | 6/2003 | Li |
| 6,657,834 B2 | 12/2003 | DiSalvo |
| 6,671,145 B2 | 12/2003 | Germain et al. |
| 6,828,886 B2 | 12/2004 | Germain et al. |
| 6,842,095 B2 | 1/2005 | Macbeth |
| 6,867,954 B2 | 3/2005 | Wu et al. |
| 6,920,025 B2 | 7/2005 | Nelson |
| 6,930,574 B2 * | 8/2005 | Gao ................................ 335/18 |
| 6,975,191 B2 | 12/2005 | Ward |
| 6,975,492 B2 | 12/2005 | DiSalvo |
| 7,009,473 B2 | 3/2006 | Zhang |
| 7,009,474 B2 | 3/2006 | Germain et al. |
| 7,019,952 B2 | 3/2006 | Huang et al. |
| 7,031,125 B2 | 4/2006 | Germain et al. |

(Continued)

*Primary Examiner* — Bernard Rojas
(74) *Attorney, Agent, or Firm* — Kevin M. Barner; Mark S. Bicks; Alfred N. Goodman

(57) ABSTRACT

A resettable switching apparatus, useful in a GFCI receptacle, has a space-efficient coaxial configuration in which a mechanical latching arrangement for resetting (i.e., closing) main switch contacts is disposed inside the trip solenoid. A movable carriage for the main contacts spans one end of the solenoid and has a latching portion in the solenoid that engages the inner end of a reset plunger in two sequential states (i.e., unlatched and latched). An electrical miswire feature is included to prevent the device from being reset until the AC power is properly connected to the device and inadvertent failure of the miswire feature due, for example, to dropping the device prior to installation is avoided. Also, an enhanced self-test, or auto-monitoring, feature is provided that is more robust than that which has been previously disclosed.

42 Claims, 27 Drawing Sheets

(56) References Cited

U.S. PATENT DOCUMENTS

| | | |
|---|---|---|
| 7,031,126 B2 | 4/2006 | Bonilla et al. |
| 7,034,224 B2 | 4/2006 | Kim et al. |
| 7,049,911 B2 | 5/2006 | Germain et al. |
| 7,068,481 B2 | 6/2006 | Radosavljevic et al. |
| 7,133,266 B1 | 11/2006 | Finlay |
| 7,209,330 B2 | 4/2007 | DiSalvo |
| 7,253,629 B1 | 8/2007 | Richards et al. |
| 7,271,987 B1 | 9/2007 | Zhang et al. |
| 7,295,410 B1 | 11/2007 | Packard et al. |
| 7,295,415 B2 | 11/2007 | Huang et al. |
| 7,307,821 B2 | 12/2007 | Wang |
| 7,315,227 B2 | 1/2008 | Huang et al. |
| 7,315,437 B2 | 1/2008 | Bonilla et al. |
| 7,317,600 B2 | 1/2008 | Huang et al. |
| 7,355,497 B2 | 4/2008 | Germain et al. |
| 7,411,766 B1 | 8/2008 | Huang et al. |
| 7,414,499 B2 | 8/2008 | Germain |
| 7,428,132 B1 | 9/2008 | Radosavljevic et al. |
| 7,498,909 B2 | 3/2009 | Zhang et al. |
| 7,538,994 B2 | 5/2009 | Bonilla et al. |
| 7,554,781 B1 | 6/2009 | Weeks et al. |
| 7,633,726 B2 | 12/2009 | Huang et al. |
| 7,643,257 B1 | 1/2010 | Morgan et al. |
| 7,683,745 B2 | 3/2010 | Gouhl et al. |
| 7,701,680 B2 | 4/2010 | Li et al. |
| 7,737,809 B2 | 6/2010 | Germain et al. |
| 7,940,498 B2 | 5/2011 | Huang |
| RE42,866 E | 10/2011 | Chan et al. |
| 8,054,590 B2 | 11/2011 | Li et al. |
| 8,093,966 B2 | 1/2012 | Mortun |
| 2004/0223272 A1 | 11/2004 | Germain et al. |
| 2005/0002137 A1 | 1/2005 | Germain et al. |
| 2005/0140476 A1 | 6/2005 | Gao |
| 2006/0262468 A1 | 11/2006 | Richter et al. |
| 2006/0273859 A1 | 12/2006 | Germain et al. |
| 2007/0041134 A1 | 2/2007 | Huang et al. |
| 2009/0147417 A1 | 6/2009 | Goodsell et al. |
| 2011/0188160 A1 | 8/2011 | Weeks et al. |

* cited by examiner

COMPACT LATCHING MECHANISM FOR SWITCHED ELECTRICAL DEVICE

CROSS-REFERENCE TO RELATED APPLICATIONS

This application contains subject matter related to subject matter contained in copending U.S. Patent Applications filed on even date herewith, application Ser. Nos. 13/422,797, 13/422,793 and 13/422,790, entitled, "SOLENOID COIL HAVING AN ENHANCED MAGNETIC FIELD," by Stephen P. Simonin, "REINSTALLABLE CIRCUIT INTERRUPTING DEVICE WITH VIBRATION RESISTANT MISWIRE PROTECTION," by Gaetano Bonasia et al., and "ENHANCED AUTO-MONITORING CIRCUIT AND METHOD FOR AN ELECTRICAL DEVICE," by Gaetano Bonasia and Kenny Padro, which applications are assigned to the assignee hereof, and the entire contents of each of which are expressly incorporated herein by reference.

BACKGROUND OF THE INVENTION

1. Field of the Invention

The present application relates generally to switched electrical devices. More particularly, the present application is directed to circuit interrupting devices, such as ground fault circuit interrupter (GFCI) devices, that switch to a "tripped" or unlatched state from a "reset" or latched state when one or more conditions is detected. Such devices consistent with the invention disclosed have a more compact latching mechanism than conventional devices and provide a reusable feature that electronically prevents a miswire condition.

2. Description of Related Art

Switched electrical devices having contacts that are biased toward the open position require a latching mechanism for setting and holding the contacts in a closed position. Likewise, switched electrical devices having contacts that are biased toward the closed position require a latching mechanism for setting and holding the contacts in an open position. Examples of conventional types of devices include devices of the circuit interrupting type, such as circuit breakers, arc fault interrupters and ground fault circuit interrupters (GFCI), to name a few. Electrical receptacles having built-in ground fault protection circuitry, i.e., GFCI receptacles, are ubiquitous. Such protection circuitry and the associated mechanisms normally take up a substantial amount of the physical space within a receptacle housing, the size of which is limited by the standard junction boxes in which they must fit. The trend toward including additional safety and other features, many required by evolving industry standards, has made it necessary to economize on interior receptacle space wherever possible.

GFCI receptacles typically use a mechanical latch for holding the contacts closed, and a solenoid, a relay, or some other such actuating device, for tripping the latch to open the contacts when an actual fault is detected or when the mechanism of the device for detecting such faults is tested. Typical mechanisms for tripping and resetting the contacts employ an arrangement in which the axis of the trip solenoid and the motion of a linked latch plate are perpendicular to the axis of a reset button and/or plunger. Despite the trend toward miniaturization, such arrangements tend to be wasteful of available space.

Additional industry standards for such circuit interrupting devices, either presently accepted or contemplated for the future, include: denying power to the user accessible and/or downstream load terminals of the device when AC power is improperly applied to the load side terminals of the device, known as a miswire condition; testing for proper operation of the device after subjecting the device to a sudden force, known as the shock, or drop, test; and providing a mechanism by which proper operation of the device is periodically confirmed without the need for human intervention, known as self-test. Conventional devices that may or may not address one or more of these additional industry requirements tend to be too large, ineffective, and/or do not provide a robust method for confirming proper functioning of the device.

SUMMARY OF THE INVENTION

The invention described herein addresses the issues mentioned above regarding conventional circuit interrupting devices. Specifically, the invention described employs a space-efficient configuration in which the mechanical latching arrangement for resetting (i.e., closing) the contacts is disposed inside the trip solenoid, and the reset plunger and the solenoid are coaxial. A device according to other aspects of the invention further includes industry compliant means for preventing the miswire condition and automatically tests, among other things, its ability to detect faults.

According to one aspect, the invention is directed to a resettable switching apparatus including a solenoid with a central axis, a first end and a second end opposite the first end; two sets of contacts, each set comprising a fixed contact and at least one movable contact biased away from the fixed contact; and an axially movable carriage having a latching portion extending into the solenoid through its first end and external portions that advance the movable contacts to close with their fixed contacts during reset. A reset plunger extends into the solenoid through its second end, is movable axially therein and is biased toward a rest position away from the latching portion of the carriage. An axially movable armature is biased toward a rest position away from the latching portion of the carriage. A solenoid activation circuit includes a normally open reset switch that closes in response to inward movement of the reset plunger to momentarily energize the solenoid when the reset plunger is pressed. The reset plunger comprises an inner end portion adapted to engage the carriage latching portion in an unlatched pushing state in which pressing of the reset plunger pushes the carriage outward at least until the solenoid is momentarily energized, and subsequently in a latched pulling state in which the reset plunger, when released, pulls the carriage inward to close the two sets of contacts. The armature is adapted to enable shifting of the state of engagement of the reset plunger with the carriage latching portion from the unlatched pushing state to the latched pulling state in response to closing of the reset switch and resulting activation of the solenoid.

From another perspective, this aspect of the invention is directed to a resettable switching apparatus comprising a solenoid having a central axis, a first end and a second end opposite the first end; two sets of contacts, each set comprising a fixed contact and at least one movable contact biased away from the fixed contact; and an axially movable carriage having a latching portion extending into the solenoid through its first end and external portions that advance the movable contacts to close with their fixed contacts during reset. A reset plunger extends into the solenoid through its second end, is movable axially therein and is biased toward a rest position away from the latching portion of the carriage. An axially movable armature surrounds the reset plunger and extends into the solenoid through its second end. The armature also is biased toward a rest position away from the latching portion of the carriage. A solenoid activation circuit includes a normally open reset switch that closes in response to inward movement of the reset plunger to momentarily energize the solenoid when the reset plunger is pressed. The latching portion of the carriage comprises at least one latch member having a transversely displaceable shoulder facing away from the second end of the solenoid. The armature has an inner end portion configured to deflect the first shoulder of the latch member transversely as the armature is drawn further into the solenoid, when energized. The reset plunger has an inner end portion with at least one latching shoulder facing away from the first end of the solenoid and engageable with the shoulder on the latch member during resetting of the apparatus when the coil is no longer energized.

According to another aspect, the invention is directed to a resettable switching apparatus comprising a solenoid having a central axis, a first end and a second end opposite the first end; two sets of main contacts, each set comprising a fixed main contact and at least one movable main contact biased away from the fixed main contact; a reset circuit for energizing the solenoid, including a normally open reset switch having at least one reset switch component spaced axially from the first end of the solenoid; and a carriage movable axially of the solenoid responsive to energizing thereof and adapted to advance the movable main contacts into engagement with their respective fixed main contacts during resetting of the apparatus. The carriage has a main portion disposed between the first end of the solenoid and the reset switch component and is adapted to close the reset switch when proximate the reset switch component. A reset actuator having a movable carriage-contacting member is adapted to move the carriage toward the reset switch component at least until the main portion of the carriage closes the reset switch to energize the solenoid.

In a preferred arrangement, the main portion of the carriage comprises a portion of the reset switch, preferably a bridging contact, which connects a pair of reset switch contacts on a circuit board to which the solenoid is mounted by at least one standoff. The main contacts preferably are disposed alongside the solenoid, and the carriage reverses direction to close the main contacts after first being moved to close the reset switch.

The features of the above-summarized aspects of the invention can be incorporated in a GFCI receptacle with the solenoid as part of the GFCI, the solenoid being energized when a fault condition is sensed to open the main contacts.

BRIEF DESCRIPTION OF THE DRAWINGS

Exemplary embodiments of the disclosed invention are described in detail below by way of example, with reference to the accompanying drawings, in which.

DETAILED DESCRIPTION OF EXEMPLARY EMBODIMENTS

As described herein, terms such as "front," "rear," "side," "top," "bottom," "above," "below," "upwardly" and "downwardly" are intended to facilitate the description of the electrical receptacle of the invention, and are not intended to limit the structure of the invention to any particular position or orientation.

Exemplary embodiments of devices consistent with the present invention include one or more of the novel mechanical and/or electrical features described in detail below. Such features include a compact latching mechanism that efficiently utilizes the space within the device housing to provide additional area for additional features and/or components. For example, certain types of GFCI devices accommodate a separate plug on the back side of the device for connecting AC power to the device (e.g., SNAPConnect® devices by Hubbell Incorporated). To accommodate the additional plug it is beneficial to reconfigure certain components within the device housing, such as the latching mechanism, and make more efficient use of the given space in the housing. One feature consistent with this objective is to provide a solenoid for actuating the latching mechanism that is coaxial with the reset pin.

In addition to providing a space-saving mechanical configuration for the devices, the present invention further includes novel electrical features as well. For example, one or more of the exemplary embodiments of the invention include an electrical miswire feature that prevents the device from being reset, or latched, until the AC power is properly connected to the device, i.e., on the line side of the device as opposed to the face, or load, side. In comparison to mechanical type miswire prevention mechanisms, an electrical solution such as provided with the present invention avoids inadvertent failure of the mechanical miswire mechanism due to, for example, dropping the device prior to installation. Additional electrical features are also provided in accordance with exemplary embodiments of the invention, such as, enhanced self-test, or auto-monitoring, features.

Some self-test features and capabilities with respect to GFCI devices have been disclosed previously, for example, in U.S. Pat. Nos. 6,807,035, 6,807,036, 7,315,437, 7,443,309 and 7,791,848, the entire respective contents of which are incorporated herein for all that is taught. An auto-monitoring feature consistent with the present invention is more robust than that which has been previously disclosed. For example, additional features are provided related to the determination of an end-of-life (EOL) condition and actions taken subsequent to such determination. Further exemplary novel electrical and mechanical features consistent with the invention are described herein below with reference to the figures.

Figure 1:
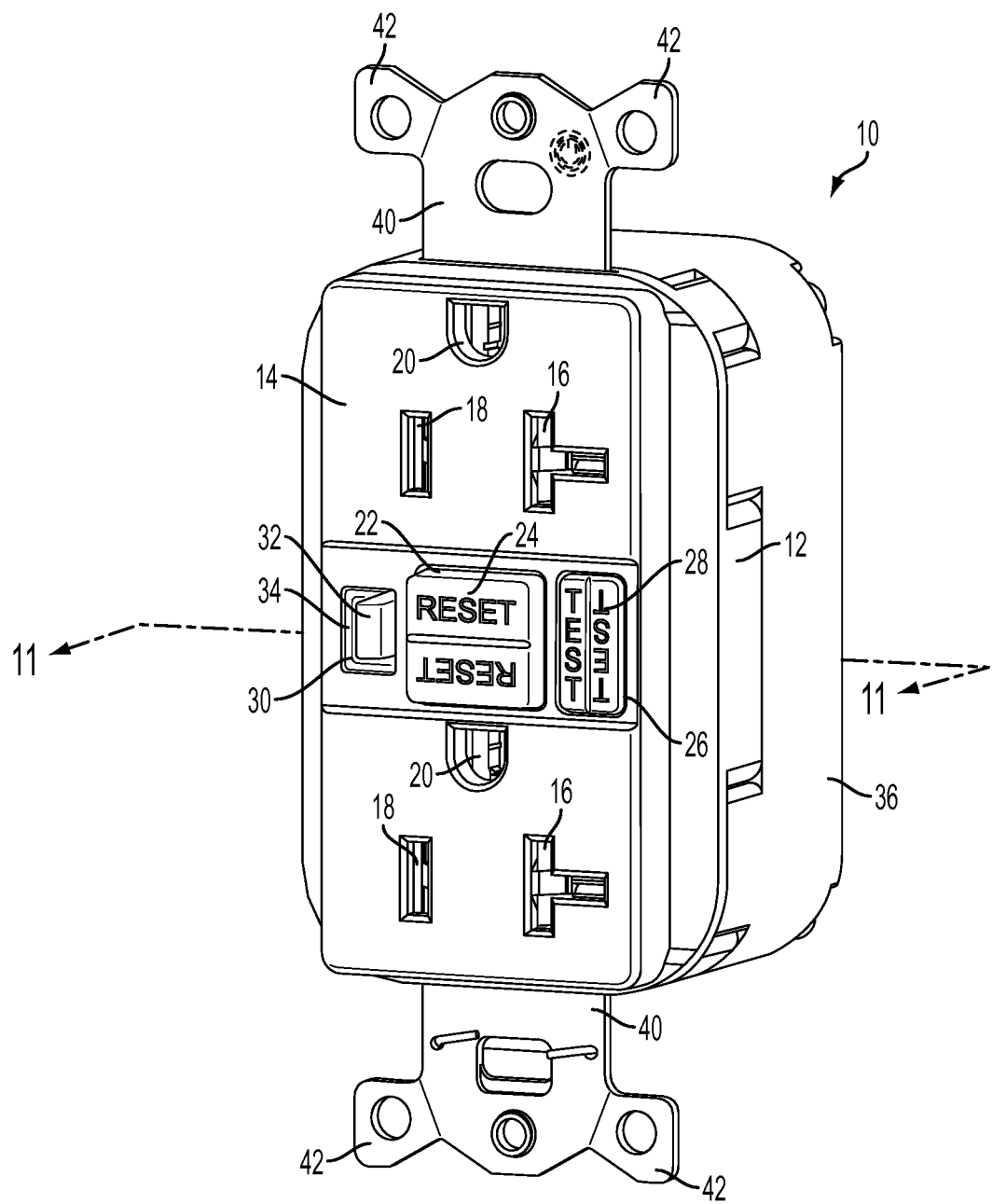
FIG. 1 is a front perspective view of a GFCI receptacle incorporating the resettable switching apparatus of the invention.
Figure 2:
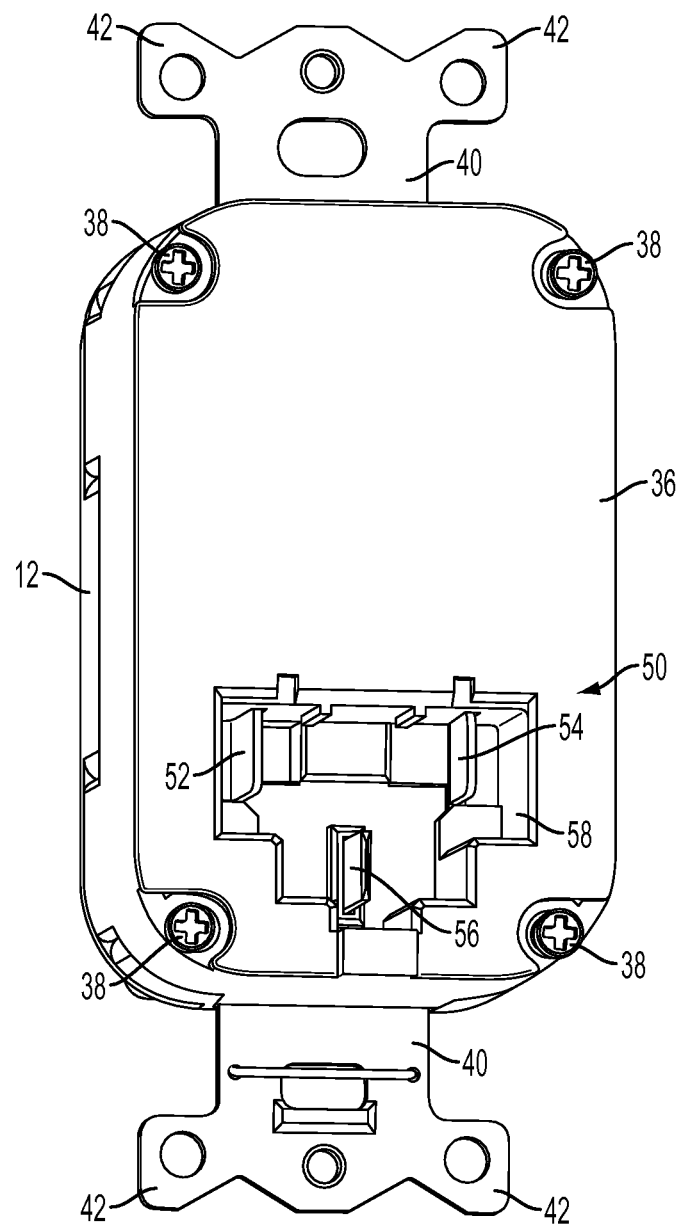
FIG. 2 is a rear perspective view of the GFCI receptacle shown in FIG. 1.

Referring to FIGS. 1 and 2, a GFCI receptacle 10 according to the invention comprises a front cover 12 having a duplex outlet face 14 with phase 16, neutral 18 and ground 20 openings. The NEMA-standard T-shaped phase openings 16 indicate that this particular exemplary embodiment is rated for 20 ampere operation. Face 14 also has a central opening 22 for a reset button 24 flanked by an opening 26 for a test button 28 and an opening 30 for concentric status indicators 32, 34. Rear cover 36 is secured to front cover 12 by four screws 38. Ground yoke/bridge assembly 40 having standard mounting ears 42 protrudes from the ends of the receptacle.

Figure 3:
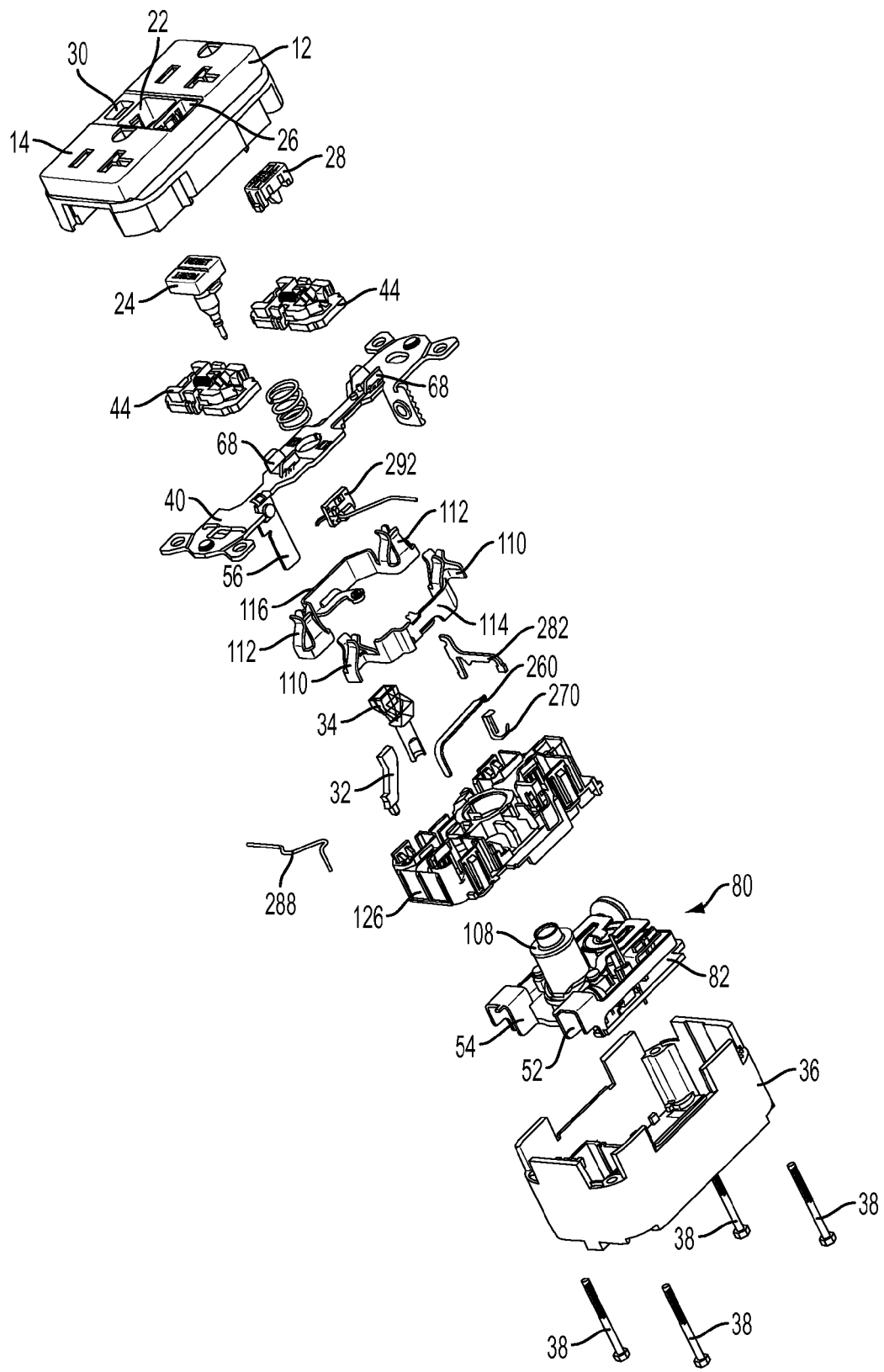
FIG. 3 is an exploded front perspective view of the receptacle of FIG. 1.

Referring to FIG. 3, the exemplary embodiment shown incorporates two tamper-resistant mechanisms 44 disposed behind face 14, one for each outlet of the duplex receptacle. The structure and operation of these tamper-resistant mechanisms are disclosed in U.S. Pat. No. 7,510,412 to Valentin, which issued on Mar. 31, 2009, the entire contents of which are incorporated herein by reference for all that is taught.

Figure 5:
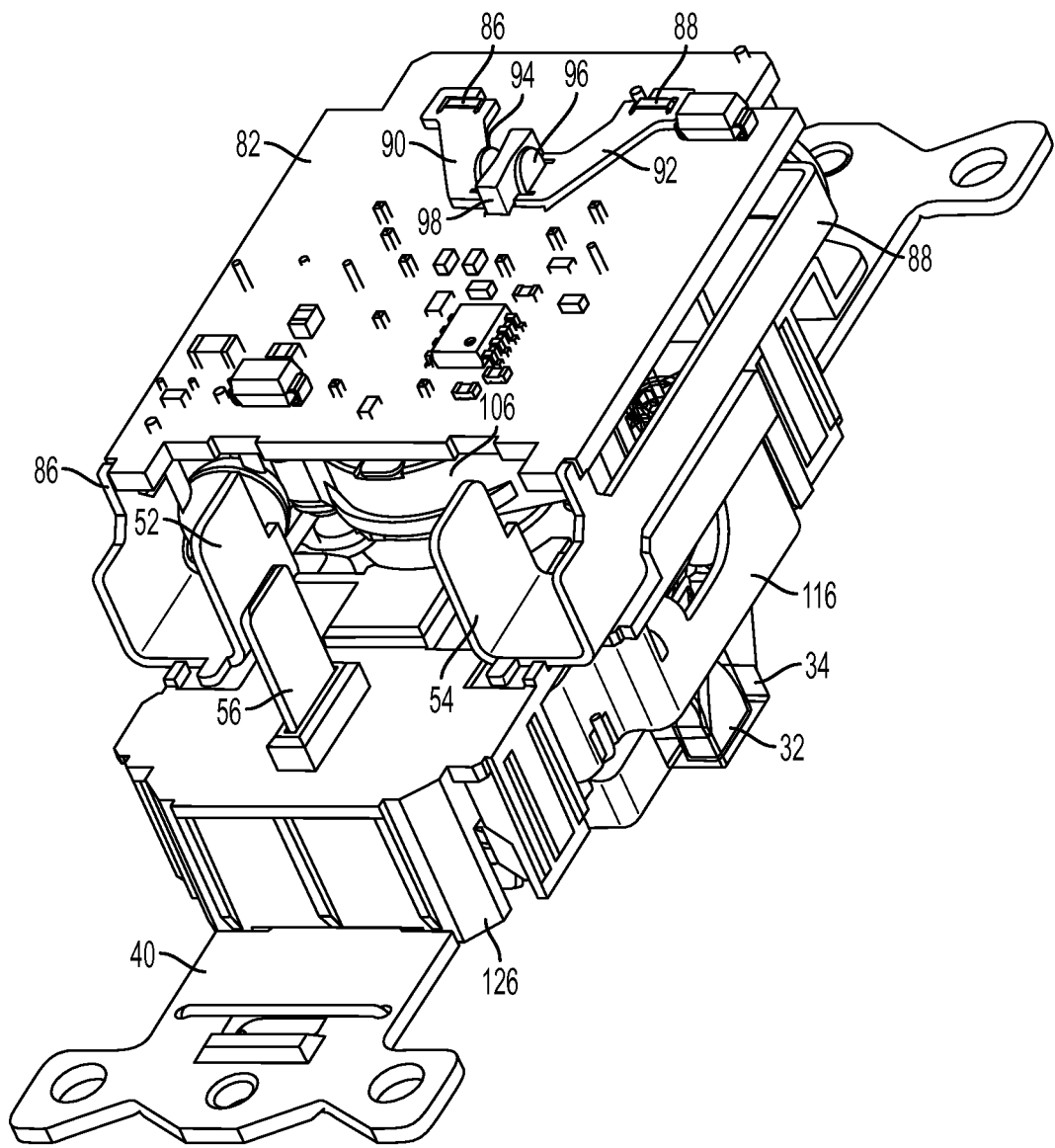
FIG. 5 is a rear perspective view of the receptacle depicted in FIG. 4.

Referring to FIGS. 2 and 5, the exemplary GFCI receptacle 10 shown includes plug-in arrangement 50 for connection to a source of electricity. This arrangement comprises line terminals in the form of a phase blade 52, a neutral blade 54 and a ground blade 56 located in a contoured recess 58 in the back of rear cover 36. The source connection is made when a mating plug (not shown) wired to an AC power source is plugged into mating recess 58. According to an alternative embodiment, standard wire-insertion and/or screw line terminals may be used instead of plug-in arrangement 50. Such an alternative embodiment requires additional push-in contact holes and/or terminal screws not shown.

Figure 6:
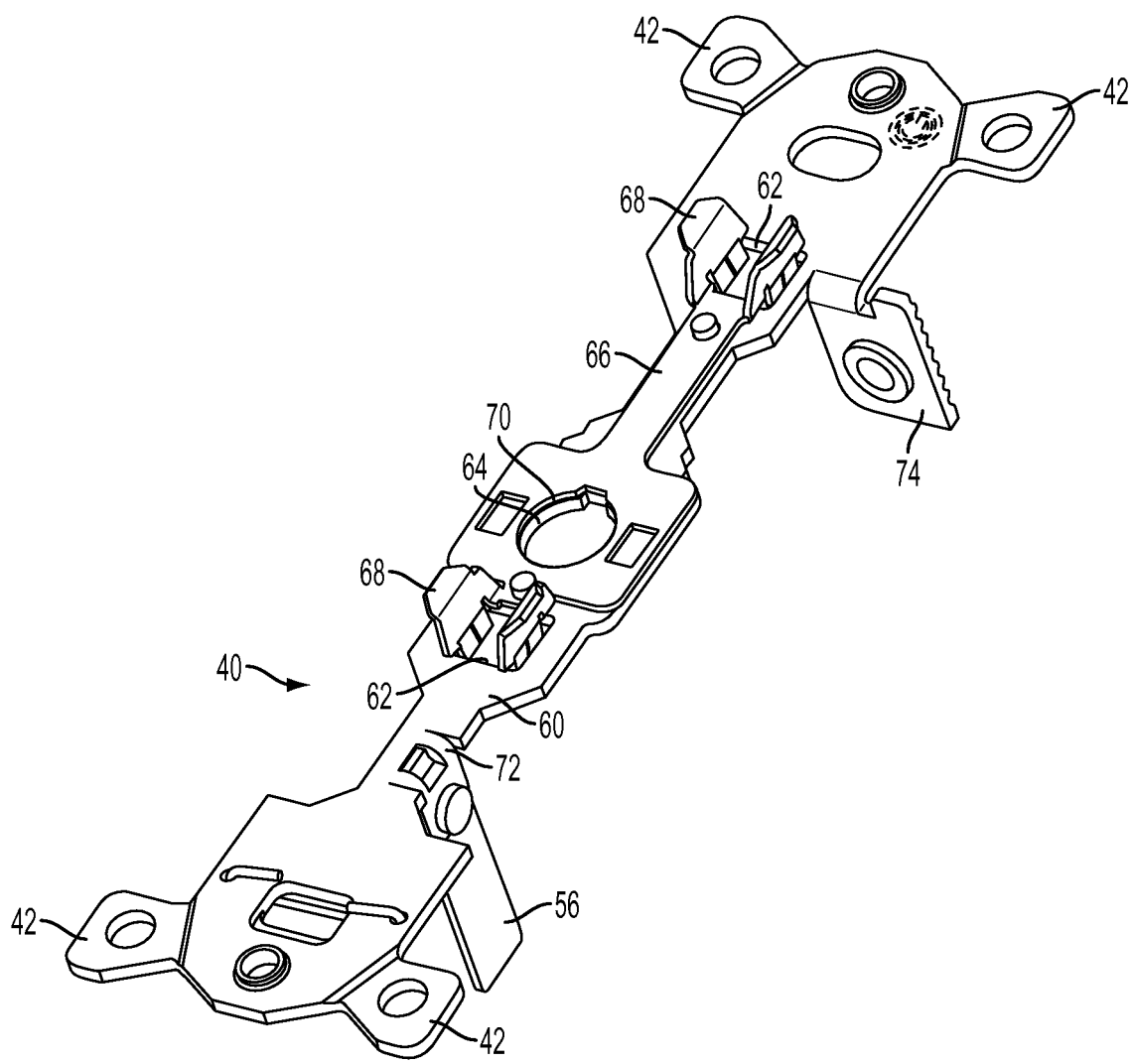
FIG. 6 is a rear perspective view of the ground yoke/bridge assembly of the receptacle of FIG. 1.

Referring to FIG. 6, ground yoke/bridge assembly 40 comprises a main full-length member 60 having two rectangular apertures 62 and a round central aperture 64. A ground plate 66 carrying two face ground terminals 68 is riveted, or otherwise securely fixed, to main section 60. Ground plate 66 also has a substantially round hole 70 in registry with aperture 64 of main full-length member 60, through which part of a solenoid coil bobbin and part of a reset button assembly extends when the device is fully assembled, as noted in more detail below. Ground blade 56 is riveted or otherwise securely fixed to a bent tab 72 on main member 60. An auxiliary grounding plate 74 is also provided.

Figure 7:
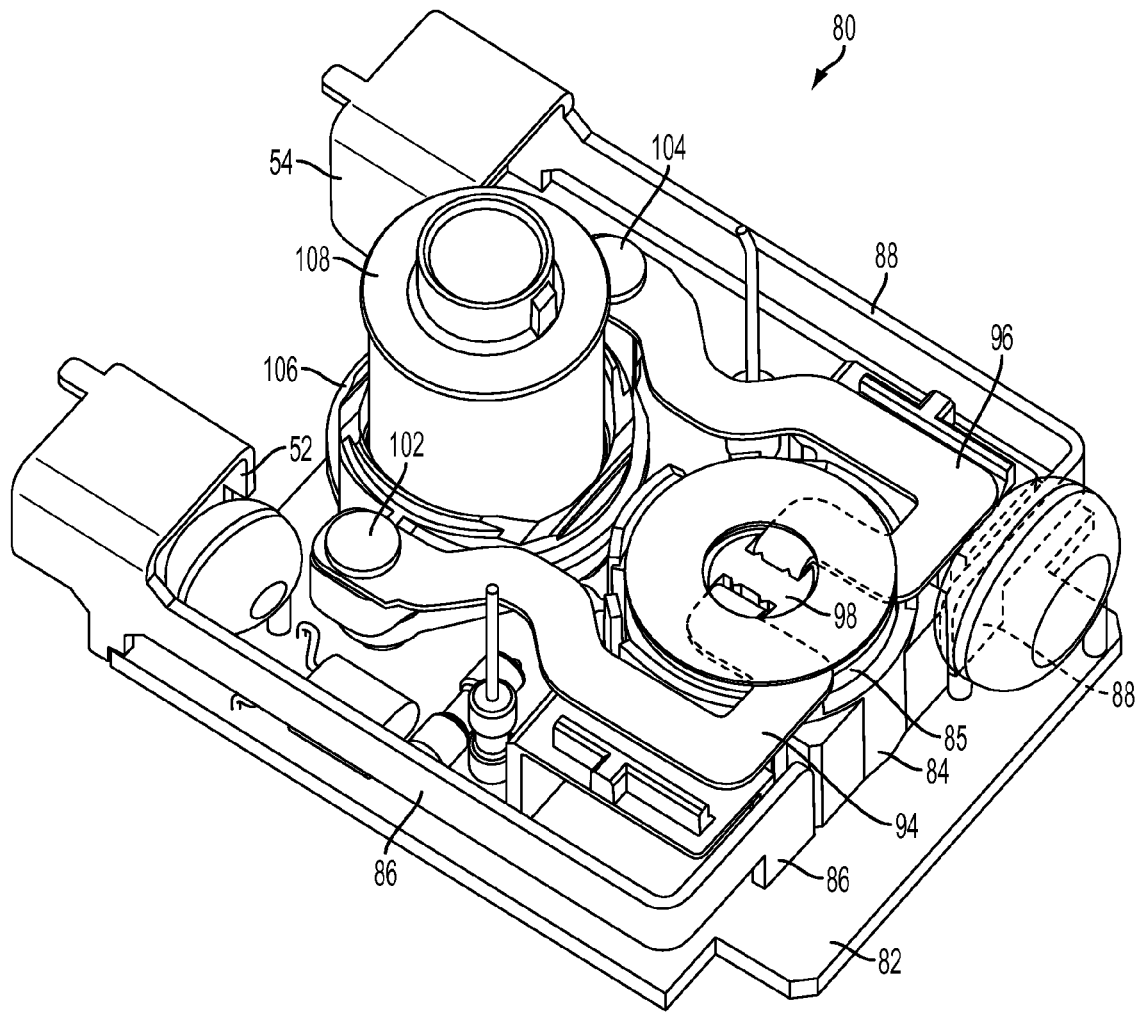
FIG. 7 is a front perspective view of the core assembly of the receptacle of FIG. 1.

Referring to FIG. 7, core assembly 80 includes circuit board 82 that supports most of the working components of the receptacle, including the GFCI circuit (see FIG. 27), sense transformer 84 and grounded neutral transformer 85. AC line power is delivered via phase conductor bar 86 and neutral conductor bar 88, which respectively carry at their ends phase blade 52 and neutral blade 54. Conductors 86 and 88 are received in holes in circuit board 82 and are connected on the underside of board 82 (see FIG. 5) to oblique linking conductors 90, 92, respectively. Line contact arms 94, 96 connect to oblique linking conductors 90, 92, respectively, and pass through transformers 84, 85 with an insulating separator 98 therebetween. Line contact arms 94, 96 are cantilevered, their respective distal ends carrying phase and neutral line contacts 102, 104, adjacent solenoid 108. The resiliency of the cantilevered contact arms biases the line contacts 102, 104 toward a lowered (i.e., open) position where they may rest on a movable contact carriage 106, made of insulating (preferably thermoplastic) material, that surrounds or substantially surrounds solenoid 108.

Figure 8:
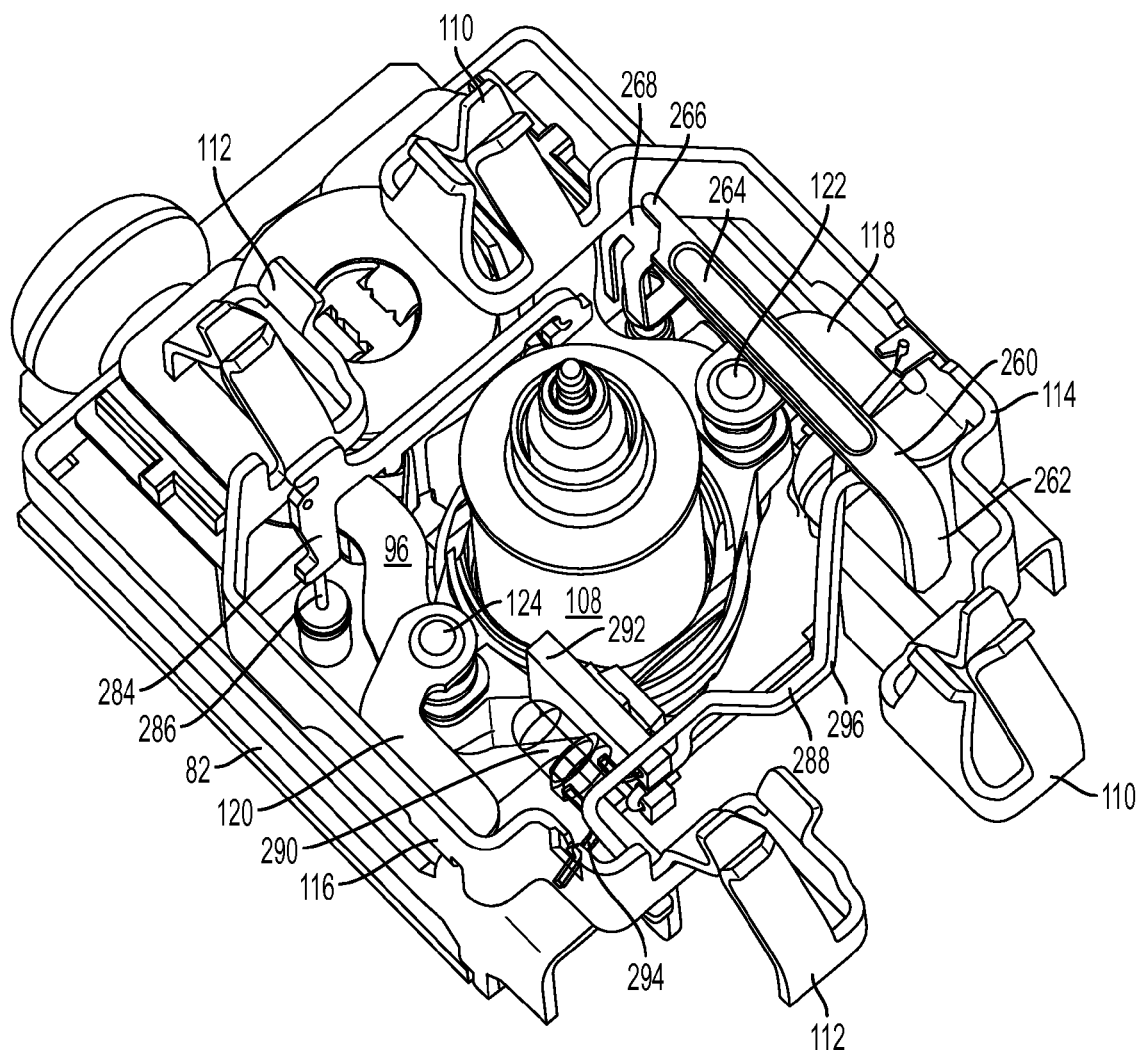
FIG. 8 is a front perspective view similar to FIG. 7 from a different angle, with bus bars and other components added.
Figure 10:
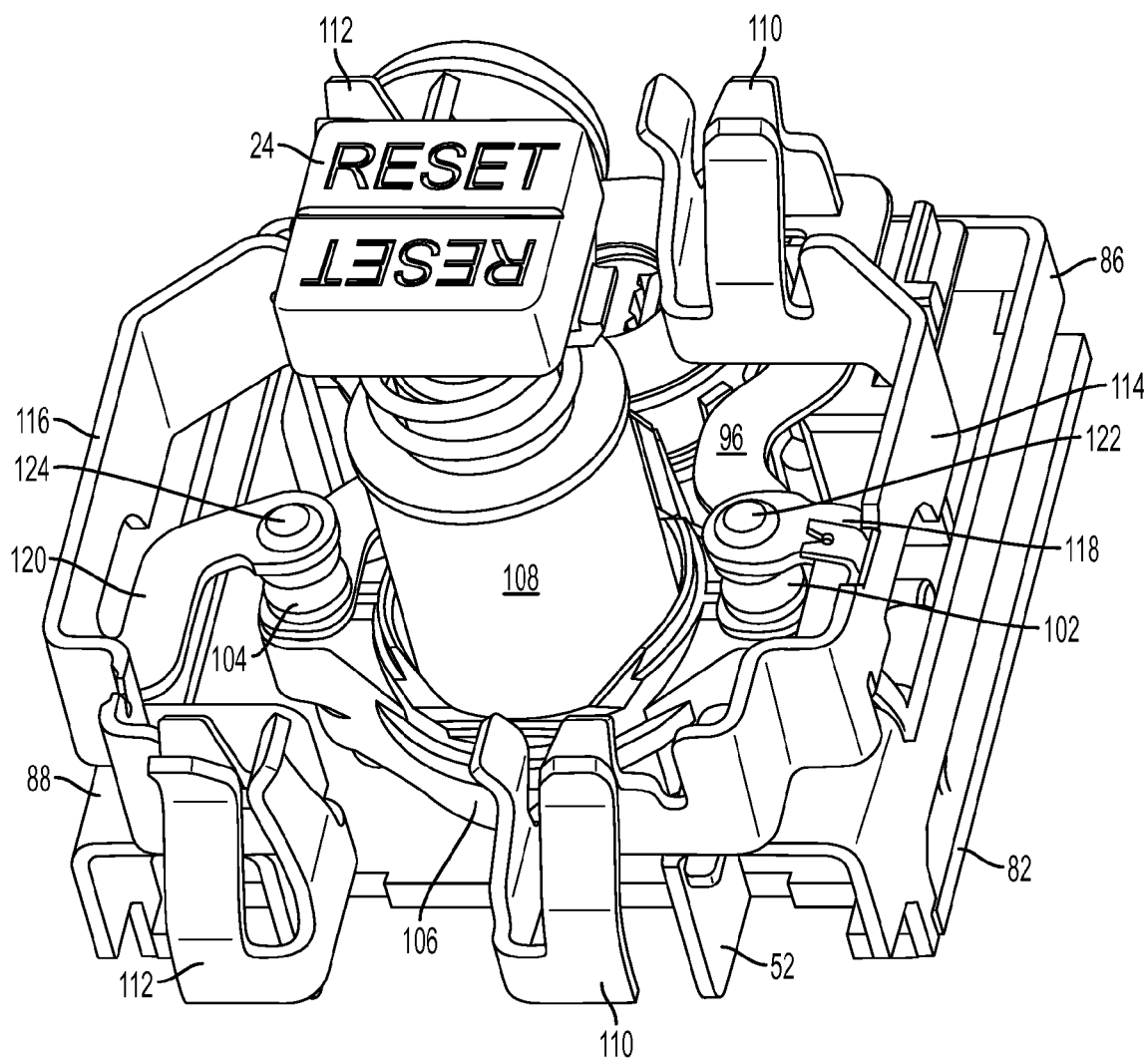
FIG. 10 is a front perspective view similar to FIG. 8 from a different angle, with some parts removed and others added.

Referring to FIGS. 8 and 10, phase and neutral face terminals 110, 112 are energized through bus bars 114, 116, respectively. Bus bars 114, 116 have respective, relatively short, contact arms 118, 120, which carry at their distal ends contacts 122, 124 aligned with their respective movable line contacts 102, 104. As seen, for example, in FIGS. 3 and 4, core assembly 80 is substantially surrounded by an insulating separator manifold 126, which also serves to compartmentalize i.e., separate, face terminals 110, 112 and bus bars 114, 116.

The Trip and Reset Mechanism

Figure 11:
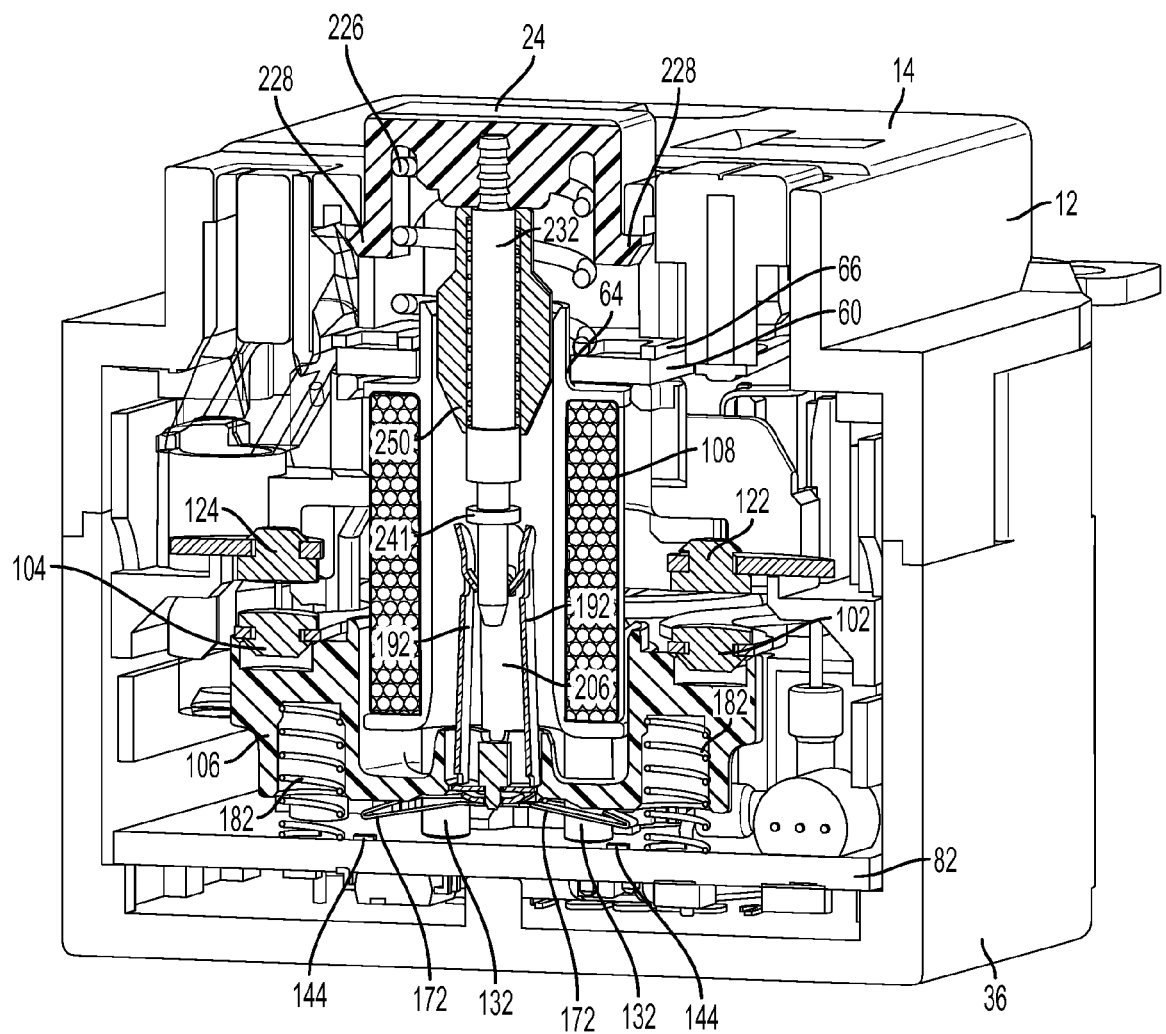
FIG. 11 is a front perspective view in transverse cross-section of the receptacle in the tripped or unlatched state taken along line 11-11 in FIG. 1.
Figure 12:
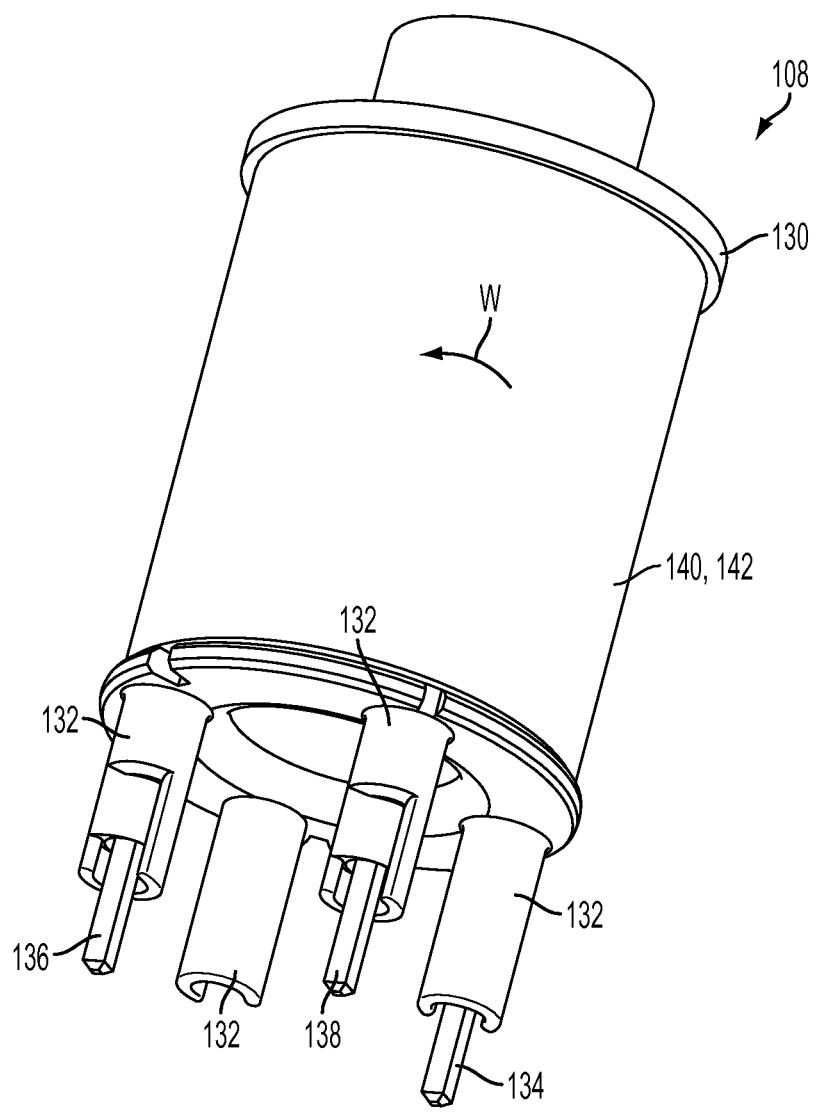
FIG. 12 is a bottom perspective view of the solenoid used in the receptacle of FIG. 1.
Figure 13:
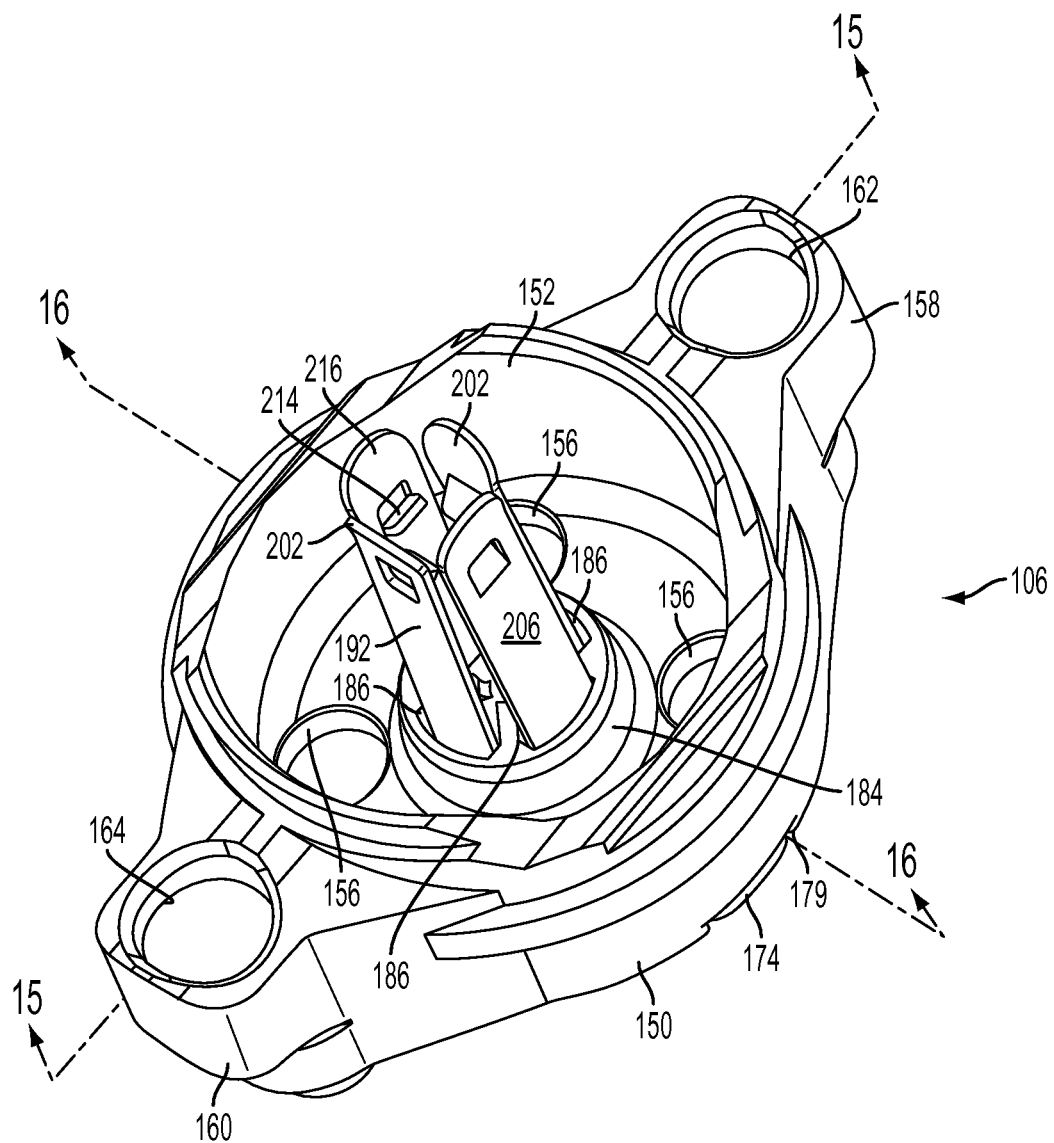
FIG. 13 is a top perspective view of a contact carriage used in the receptacle of FIG. 1.

The components of the trip and reset mechanism will now be described. Referring to FIGS. 11 and 12, solenoid 108 includes a coil bobbin 130 having four standoffs 132, which space the solenoid from circuit board 82. Conductive pins 134, 136, 138 extend through three of the standoffs and penetrate circuit board 82 where they are soldered to separate circuit leads (not shown), anchoring the solenoid to the circuit board. Two concentric coils, preferably of the same wire gauge, are wound in series in the same direction, "W" (see FIG. 12), around bobbin 130 comprising an inner coil 140 preferably having about 600 turns, and an outer coil 142 preferably having about 320 turns. Winding of the two concentric coils begins at pin 134, to which the inner end of inner coil 140 is connected, and proceeds to pin 136, to which the outer end of inner coil 140 is connected. Winding continues in the same direction with the inner end of outer coil 142, which is also connected to pin 136, and proceeds to pin 138, to which the outer end of outer coil 142 is connected. A layer of tape covers outer coil 142.

As explained more fully below, tripping of the GFCI device in the event of a fault employs an enhanced electromagnetic force combining the force from both coils 140, 142 in series by causing a voltage to be applied across pins 134 and 138. Both coils are also energized during reset, when reset switch contact pads 144 on circuit board 82 are electrically connected together as described below. Fail-safe tripping of the GFCI device in the event of a malfunction, however, involves only inner coil 140 by causing a voltage to be applied across pins 134 and 136, creating a power-denial, end-of-life condition, described further below.

Referring to FIGS. 13-17, contact carriage 106 includes a substantially tube-like, or cup-like, body 150 having a central recess 152 dimensioned to slidably surround solenoid 108. An end or bottom wall 154 of body 150 has four holes 156 positioned and sized to slidably accommodate standoffs 132 of solenoid 108. External wings 158, 160 of body 150 have respective recesses 162, 164, which are configured to cradle movable line contacts 102, 104, respectively, alongside and adjacent to solenoid 108.

Figure 14:
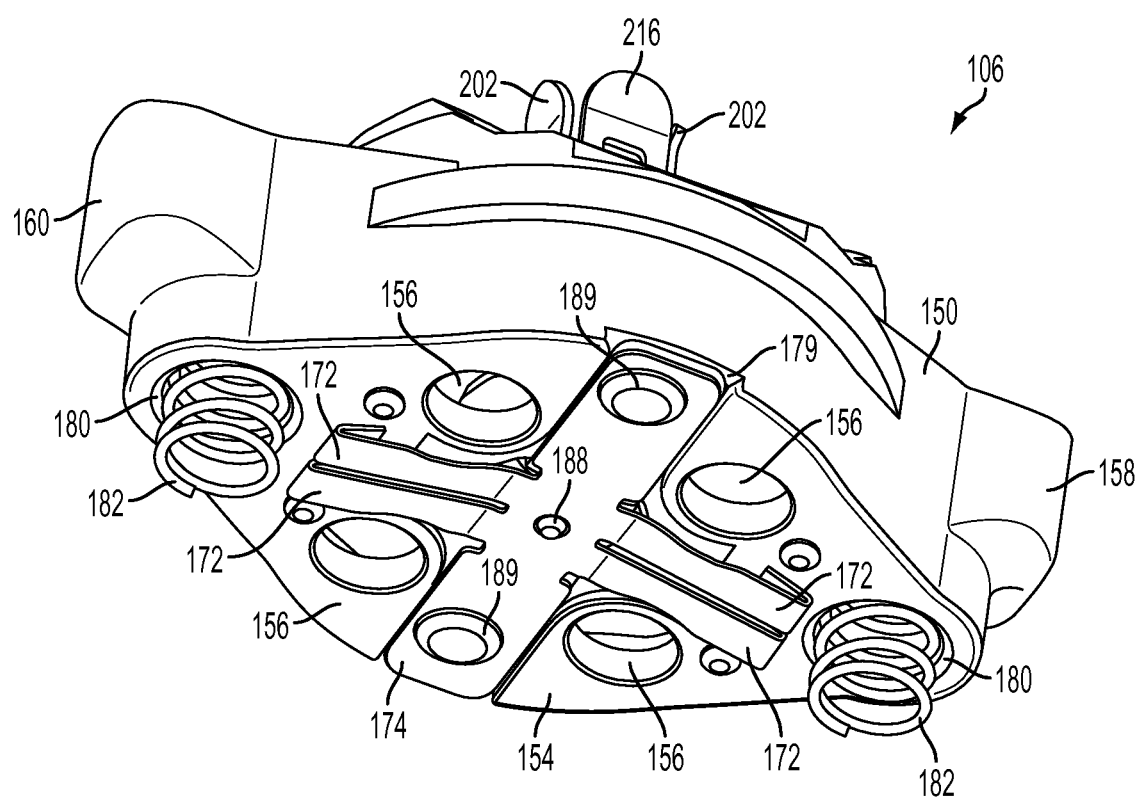
FIG. 14 is a bottom perspective view of the contact carriage of FIG. 13.
Figure 15:
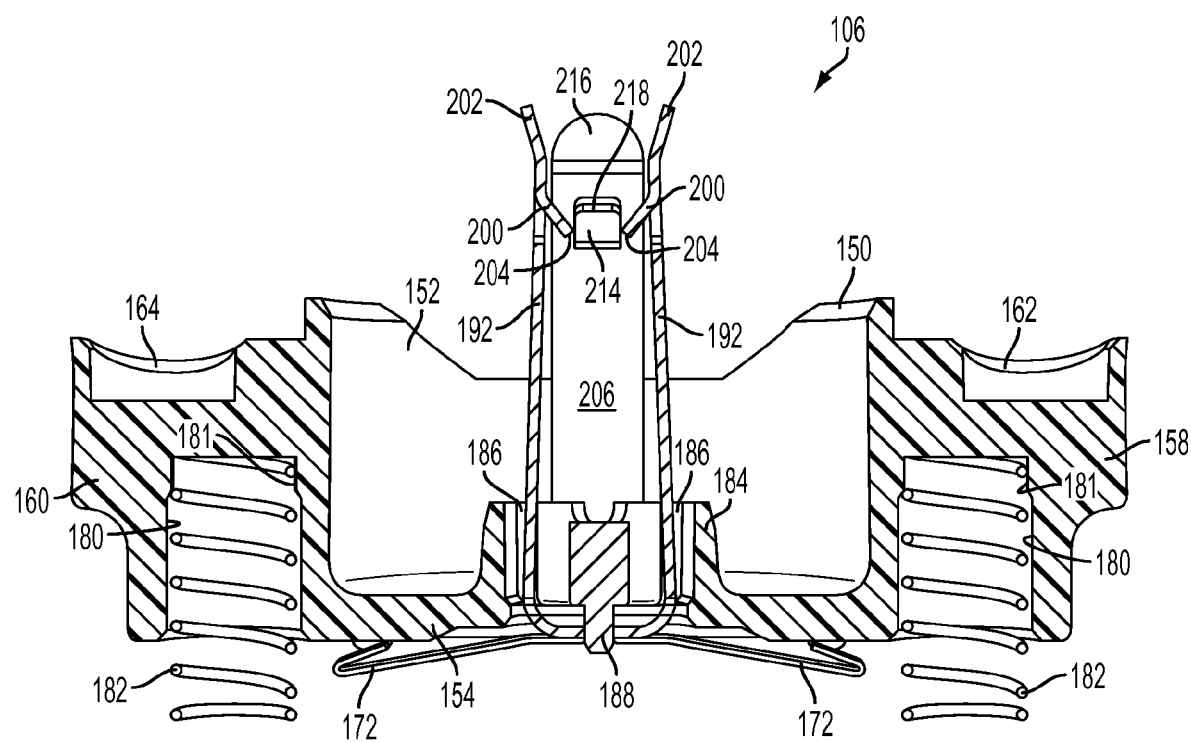
FIG. 15 is a side elevational view in transverse cross-section view of the contact carriage of FIG. 13 taken along line 15-15.
Figure 16:
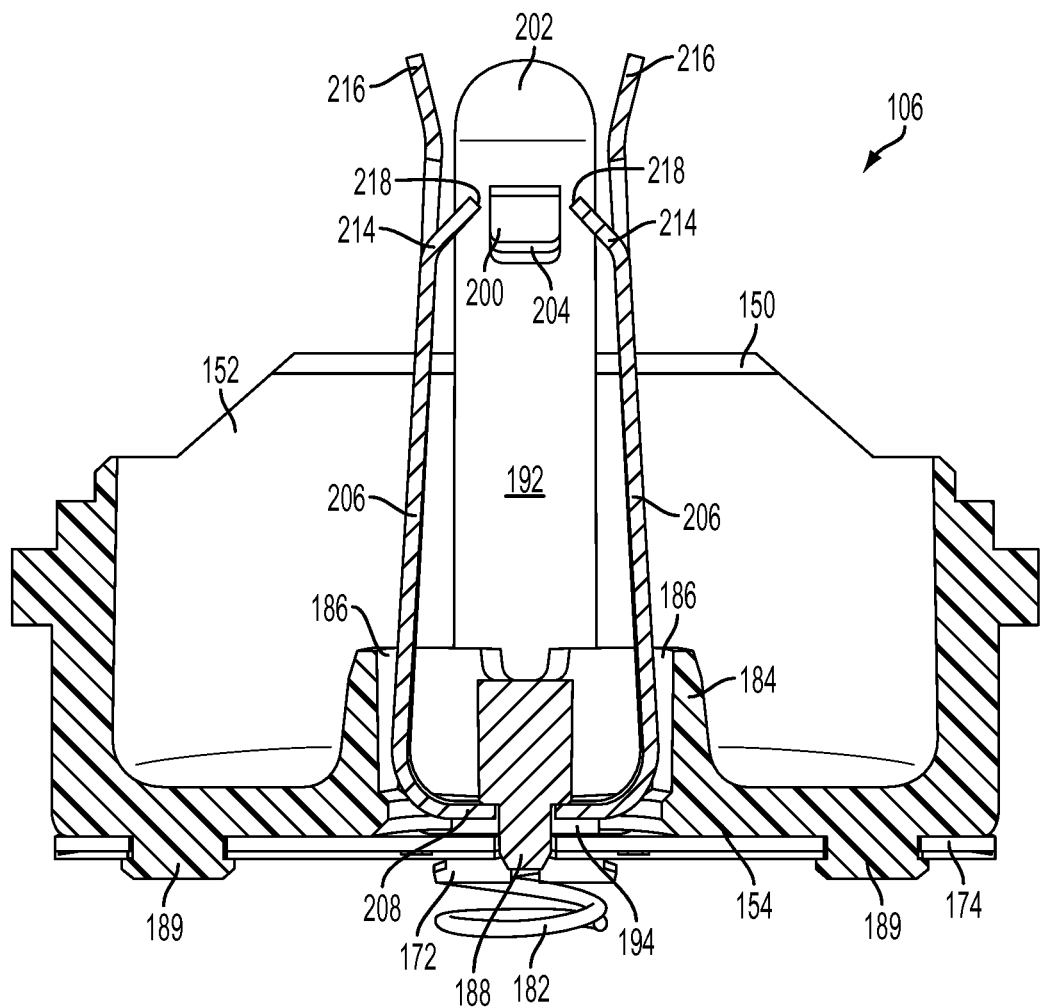
FIG. 16 is an end elevational view in transverse cross-section of the contact carriage of FIG. 13 taken along line 16-16.
Figure 17:
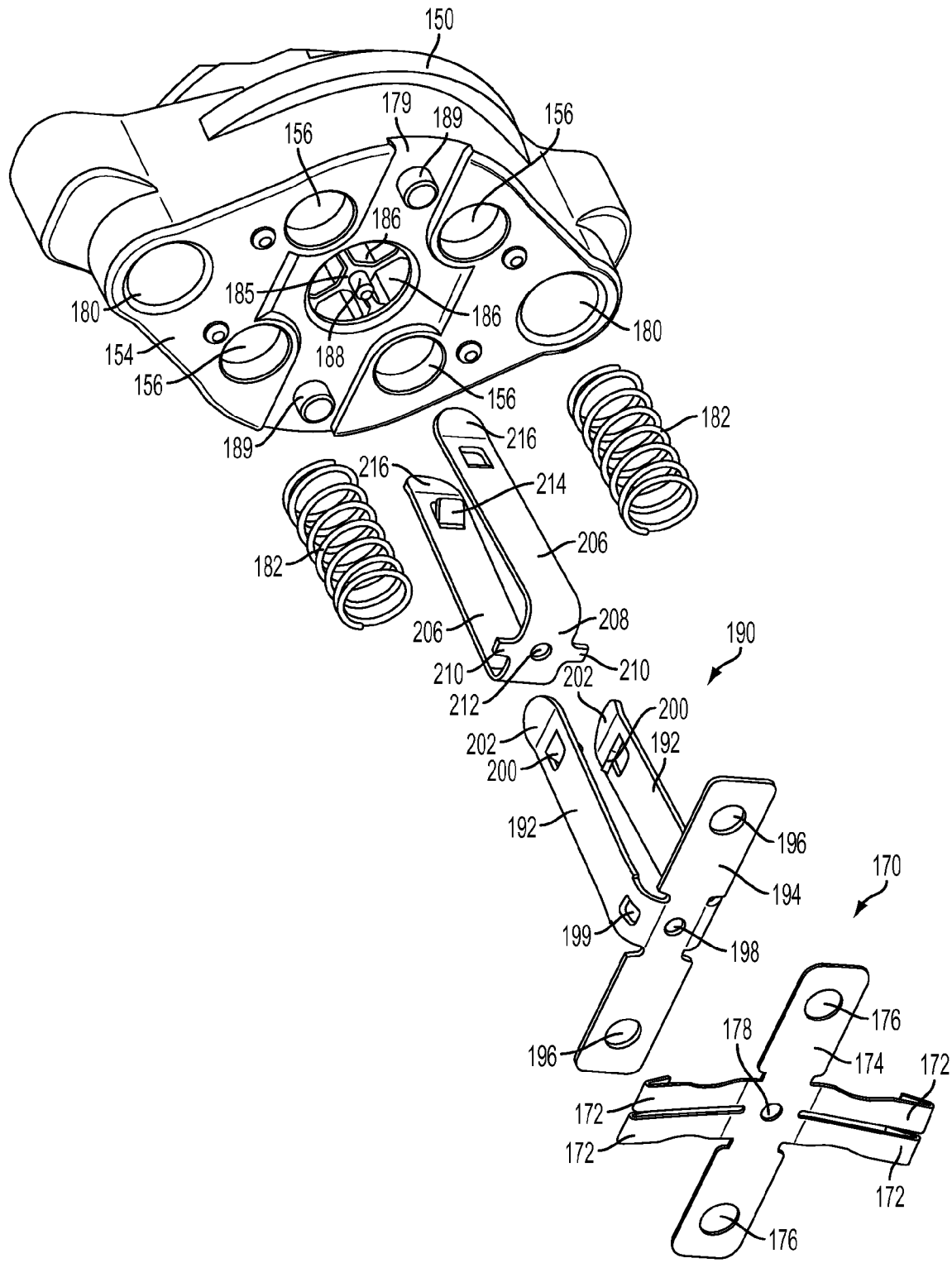
FIG. 17 is an exploded rear perspective view of the contact carriage of FIG. 13.

Bottom wall 154 of carriage 106 has on its underside two blind holes 180 in which coil springs 182 are seated. Coil springs 182, which abut circuit board 82 (see FIG. 11), are frictionally retained in holes 180 by virtue of the reduced-diameter inner end 181 of each hole (see FIG. 15). Bottom wall 154 also has a central hub 184 that projects upwardly into recess 152. Central hub 184 has four slots 186 and a central locating pin 188 on its underside, as best seen in FIG. 17. The underside of bottom wall 154 also has a flat channel 179, and two anchoring studs 189 for attaching the parts described below. Attachment of these parts involves heating and flattening anchoring studs 189 to lock all of the parts together, as seen in FIGS. 14 and 16. In the exploded view of FIG. 17, however, which illustrates assembly of the parts, anchoring studs 189 are depicted in their pre-deformed state.

Referring to FIG. 17, leaf spring contact assembly 170, comprising a single integral member in the embodiment shown, is attached to the underside of bottom wall 154. Assembly 170 preferably has two pair of conductive leaf spring contacts 172 cantilevered outwardly from a central mounting plate 174, which has two mounting holes 176 and a central locating hole 178. When assembled, mounting plate 174 is seated in channel 179, with locating pin 188 in locating hole 178 and anchoring studs 189 in mounting holes 176. In their relaxed state, leaf spring contacts 172 depend from bottom wall 154 at a shallow angle, with their distal portions directly above reset contact pads 144 on circuit board 82. Except for instances when reset button 24 is pressed, the leaf spring contacts 172 remain above circuit board 82, spaced from reset contact pads 144 (see FIG. 11).

A latch beam assembly 190, comprising a single integral member in the embodiment shown, is also attached to the underside of bottom wall 154. Latch beam assembly 190 includes a pair of opposed latch beams 192 that project upwardly from a central mounting plate 194 which abuts mounting plate 174 of leaf spring contact assembly 170. Mounting plate 194 has two mounting holes 196 which receive anchoring studs 189, a central locating hole 198 which receives locating pin 188, and two lateral locating apertures 199. Latch beams 192 extend upwardly through a pair of opposed slots 186 in central hub 184. Each latch beam 192 is transversely resilient and has an inwardly and downwardly directed latch tab 200 just below a slightly flared tip 202, defining a latching shoulder 204 that faces generally downward as seen, for example, in FIGS. 15-17.

A pair of opposed, transversely resilient reset beams 206 extend upward through the other pair of opposed slots 186 in central hub 184. Reset beams 206, in this embodiment, are made of a unitary, one-piece member having a mounting bight portion 208 with opposed locating tabs 210 and a central locating hole 212. When assembled, the upper surface of bight portion 208 abuts the underside 185 of central hub 184, with locating pin 188 in locating hole 212. The lower surface of bight portion 208 abuts mounting plate 194 of latch beam assembly 190, with locating tabs 210 resiliently retained in locating apertures 199. Each reset beam 206 has an inwardly and upwardly directed reset tab 214 just below a slightly flared tip 216, defining a reset shoulder 218 that faces generally upward as seen in FIGS. 15-17.

The Reset Button Assembly

Figure 18:
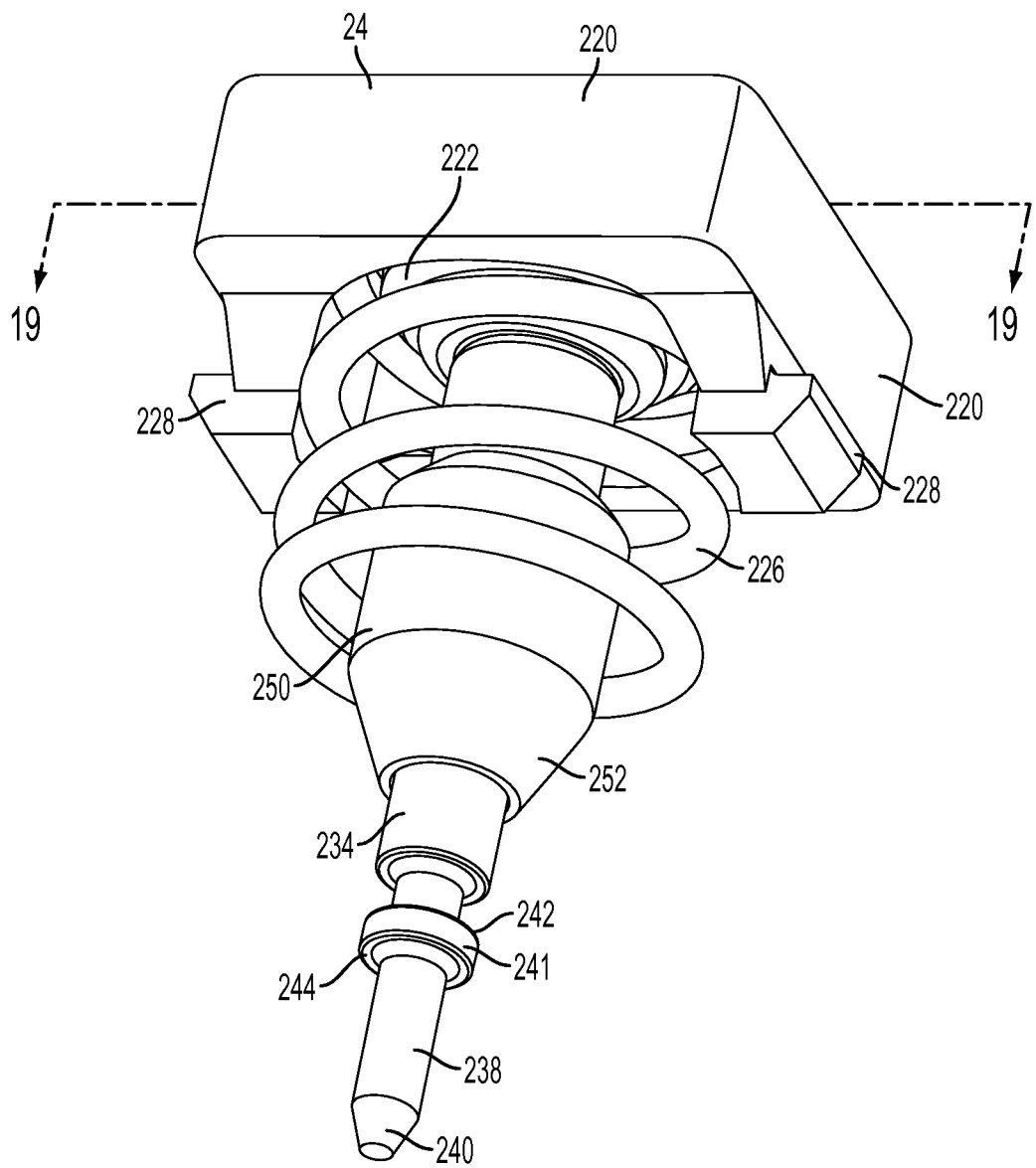
FIG. 18 is a rear perspective view of the reset button assembly used in the receptacle of FIG. 1.
Figure 19:
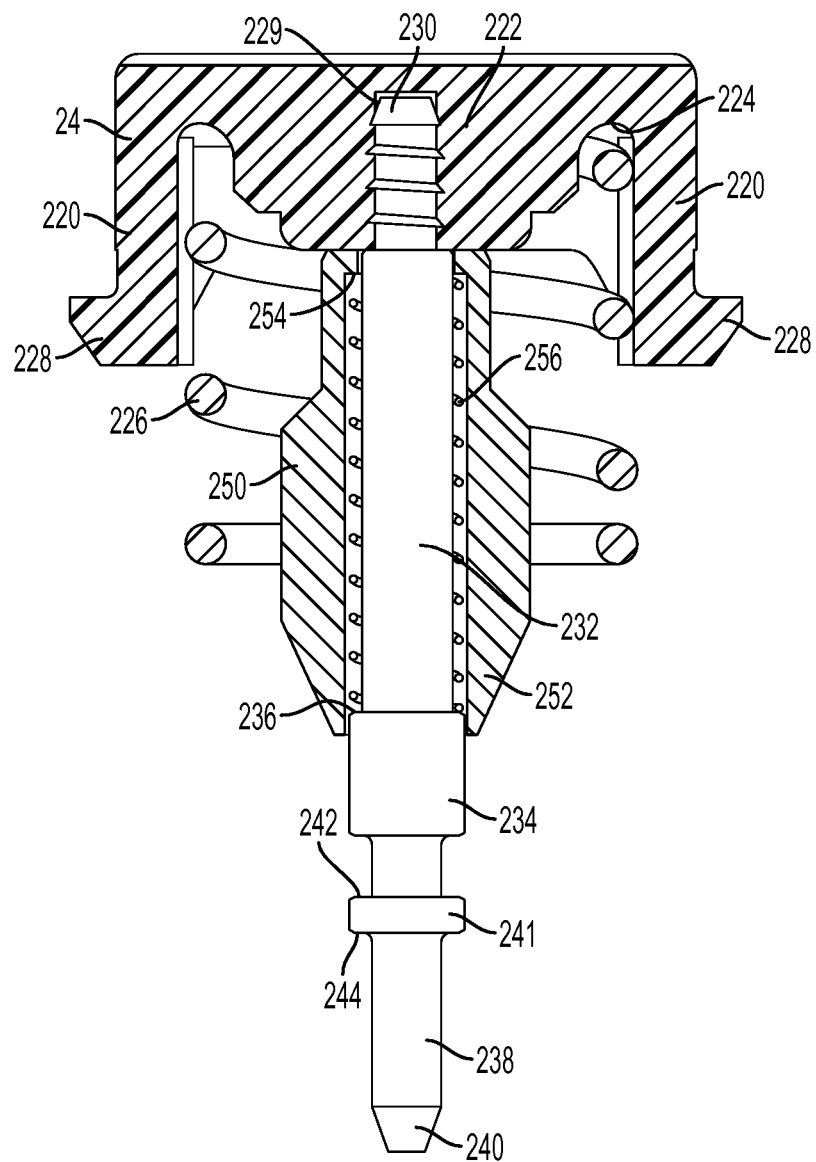
FIG. 19 is a side elevational view in transverse cross-section of the reset button assembly of FIG. 18 taken along line 19-19.

FIGS. 11, 18 and 19 depict details of the reset button assembly according to one exemplary embodiment of the invention. Reset button 24 has four depending side walls 220 surrounding a round central boss 222, which defines, with the side walls 220, an annular seat 224 for a reset spring 226. Each of the two side walls, which are parallel to the sides of the receptacle, has an outwardly facing retaining tab 228. A reset plunger 230 is fixed to reset button 24 in blind hole 229 within central boss 222. Reset plunger 230 comprises an elongated upper section 232 of substantially uniform and constant diameter, a wider relatively short middle section 234 having an upper shoulder 236, and a narrower lower section 238 having a tapered tip 240. Lower section 238 also has an intermediate collar 241 approximately as wide as middle section 234 with an upper shoulder 242 and a lower shoulder 244. A hollow ferrous armature 250 surrounds and is movable along reset plunger 230. Armature 250 has a frustoconical lower end 252 and an upper inner shoulder 254. Armature return spring 48, retained between shoulders 254 and 236, urges armature 250 upwardly to abut central boss 222 when at rest. As seen in FIG. 11, retaining tabs 228 of reset button 24 are captured beneath adjacent portions of the face 14 of front cover 12 (when in the tripped or unlatched state) while reset spring 226 rests against ground plate 66 to urge reset button 24 and the attached reset plunger 230 upwardly.

The Reset Operation

The reset operation of a device in accordance with the present exemplary embodiment will now be described with reference to FIGS. 20-26. Some of the latching components depicted in these figures are slightly modified as compared to those depicted in the earlier figures. Specifically, the embodiment depicted in FIGS. 20-26 has a larger armature 250, and a longer collar 241 on plunger 230. Further, one of the reset beams 206 has a downwardly (instead of upwardly) directed tab 215 (see FIGS. 21 and 24), which functions similarly as latch tabs 200 on latch beams 206, thus providing a greater bite on upper shoulder 242 of collar 241 during latching.

Figure 20:
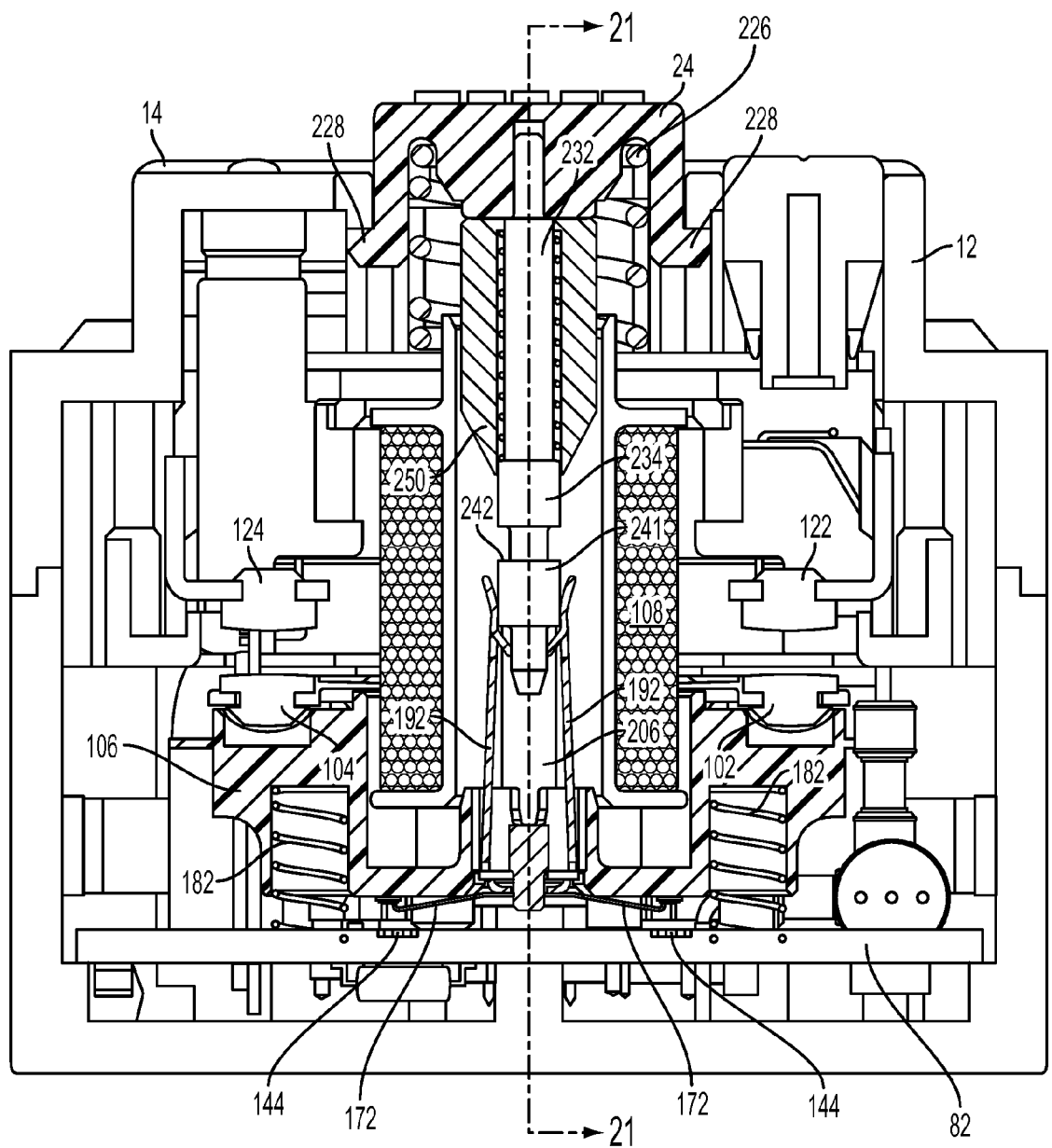
FIGS. 20, 22, 23, 25 and 26 are front elevational views in transverse cross-section similar to FIG. 11 showing an alternate version of the latching components of the receptacle in progressive states during the resetting process.
Figure 21:
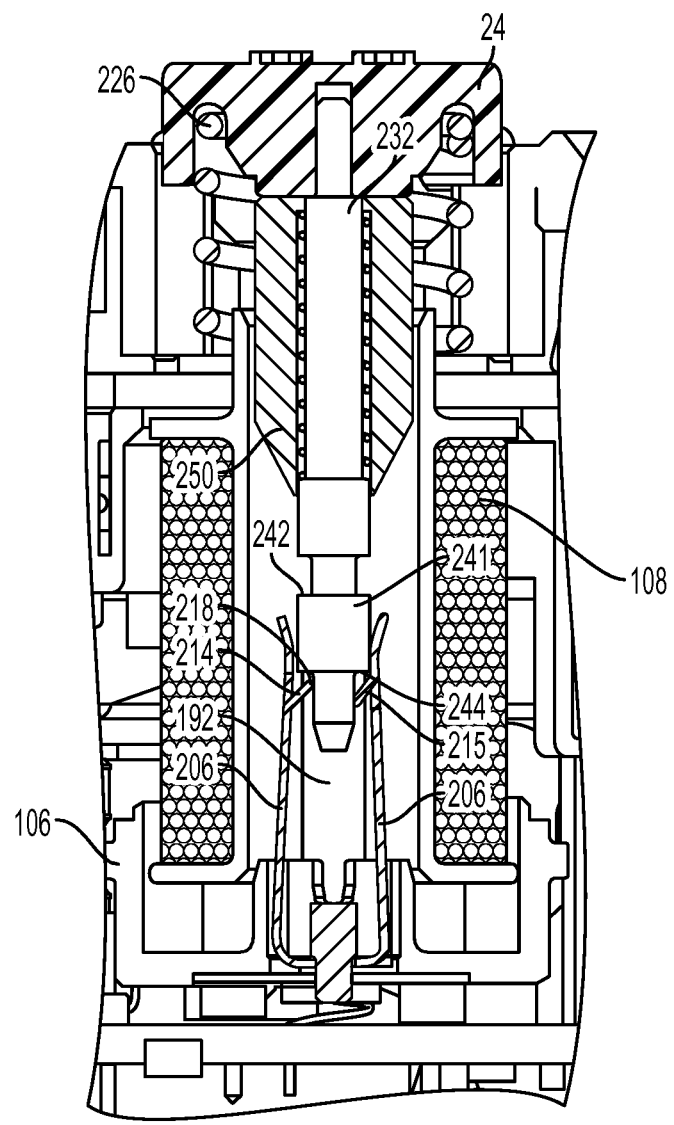
FIG. 21 is a front elevational view in cross-section of the state of the latching components shown in FIG. 20 taken along line 21-21.

FIGS. 20 and 21 illustrate the tripped or unlatched state (open contacts 102, 122 and 104, 124) just prior to initiating the reset sequence. In this state, reset button 24 is in its highest position relative to the face 14 of the housing and protruding with tabs 228 abutting the underside of front cover 12, which is indicative to a user that the device is in the tripped state. Collar 241 nests between the upper portions of latch beams 192 and reset beams 206, with its lower shoulder 244 just above the upper edge 218 of reset tab 214 (see FIG. 21). Contact cradle 106 is supported solely by springs 182, which keep leaf spring contacts 172 spaced from reset contact pads 144 on circuit board 82.

Figure 22:
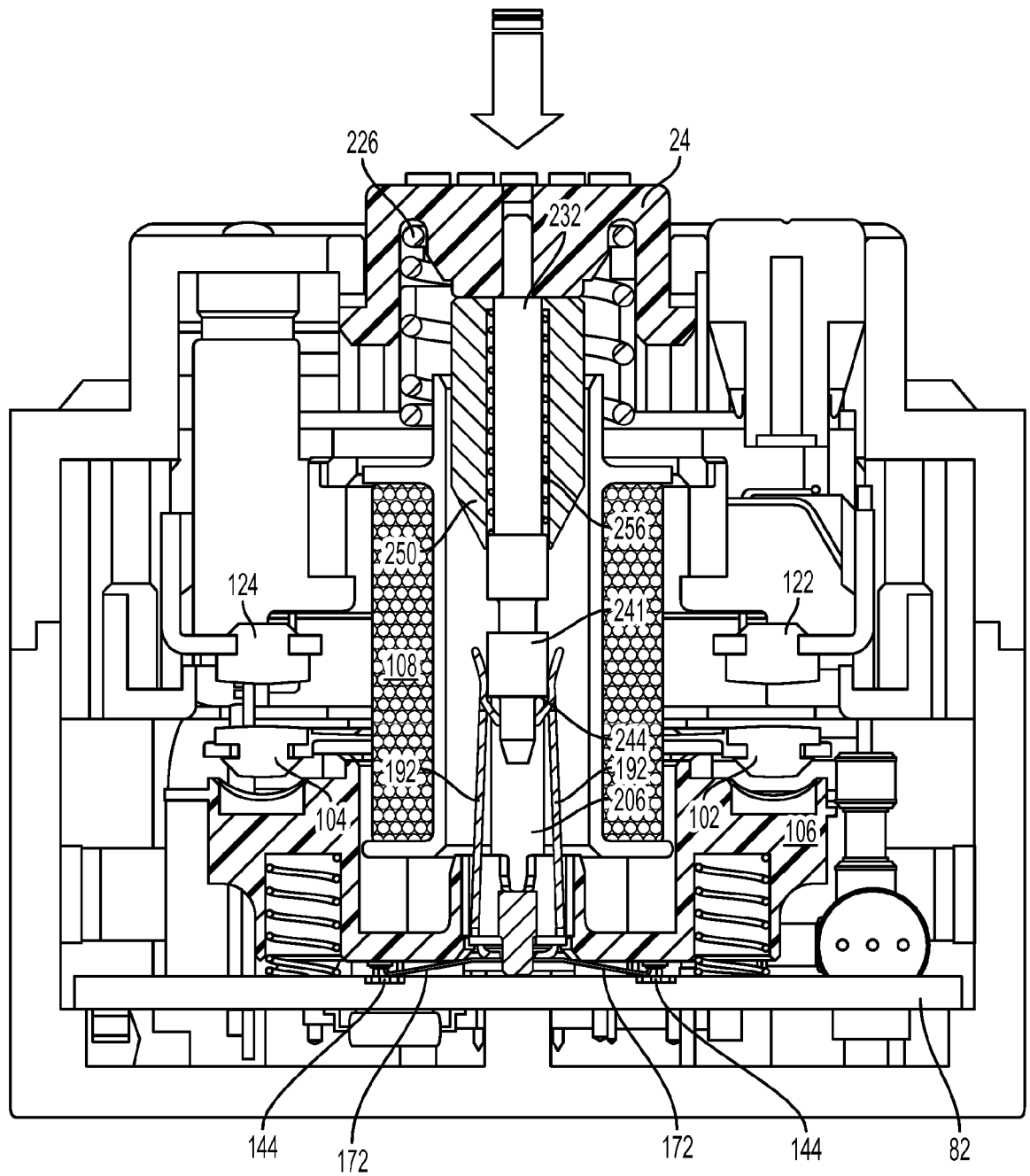

FIG. 22 illustrates the condition of the latch components of FIGS. 20 and 21 when reset button is initially being pressed. Specifically, when reset button 24 is pressed, lower shoulder 244 of collar 241 engages the upper edge 218 of reset tab 214 (see FIG. 21), forcing reset beam 206 and the attached contact carriage 106 downward until leaf spring contacts 172 electrically connect reset contact pads 144 on circuit board 82. This closes a reset circuit which ultimately activates, or energizes, solenoid 108 to fire on a positive half-cycle of the AC waveform. Further details of the operation of the reset circuit and other electrical operations of exemplary GFCI devices according to the invention are provided below in reference to FIGS. 27 and 28.

Referring again to FIGS. 22-26, as the energized solenoid pulls armature 250 downward against the bias of spring 256 (see FIGS. 22, 23 and 24), tapered lower end 252 of the armature spreads apart latch beams 192 and reset beams 206, freeing reset tab 214 from lower shoulder 244 of collar 241. With pressure still exerted on reset button 24 by the rear, reset plunger 232, including collar 241, move further downward (see FIG. 25) until upper shoulder 242 of collar 241 clears latch tabs 200 on latch beams 192 and tab 215 on reset beam 206. On the negative, non-firing, half-cycle of the AC waveform, solenoid 108 is instantly de-energized, allowing the compressed armature return spring 256 to retract armature 250. It should be noted that although the present embodiment contemplates the solenoid to be activated on the positive half-cycle of the AC waveform when the reset button is pressed and de-activated on the negative half-cycle, it is also within the scope of the invention that solenoid activation occur on the negative half-cycle and de-activation on the positive half-cycle. One having skill in the art would appreciate how to invert the AC waveform for this purpose, for example, by selectively placing a diode in the reset circuit.

Figure 25:
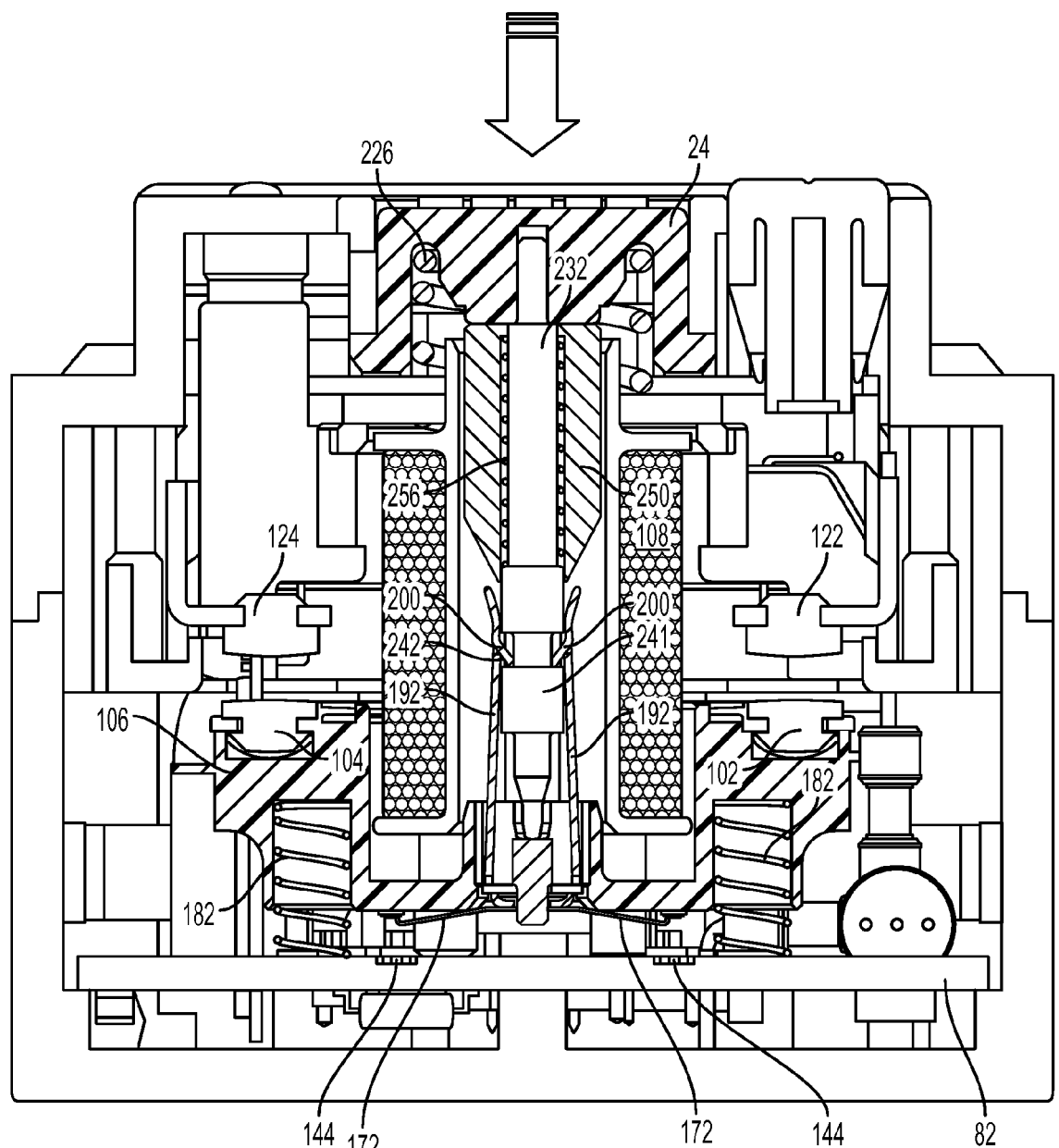

With armature 250 no longer between latch beams 192 and reset beams 206, the beams spring back under their natural bias to their original positions, i.e., they spring inward toward each other as shown in FIG. 25. Because collar 241 is now below latch tabs 200, lower edges 204 of latch tabs 200 (see FIG. 16) and the lower edge of tab 215 engage the upper shoulder 242 of collar 241. With no downward force now being applied to the contact carriage 106 via reset beam 206, coil springs 182 raise the contact carriage to disengage leaf spring contacts 172 from reset contact pads 144, thus preventing further energizing of the solenoid. Also, armature 250 rises under the return bias of spring 256. In this "pre-latched" state (see FIG. 25), the movable contacts 102, 104 have moved closer to their respective fixed contacts 122, 124, but have not yet closed with them, i.e., they have not contacted them.

The impact of the top of retracting armature 250 on the underside of reset button 24 provides a tactile indication to the user that reset button 24 can be released. When reset button 24 is released, reset return spring 226 pulls the reset button assembly, including collar 241, latch tabs 200 and the now latched contact carriage 106, upward until contacts 102, 122 and 104, 124, respectively, are closed (see FIG. 26). In this fully reset state, latch tabs 200, which abut upper shoulder 242 on reset plunger 232, hold reset button 24 nearly flush with the face 14 of the receptacle, indicating that the device is in the latched, or reset state. This is in comparison to FIG. 20, which shows the highest position of reset button 24 when in the unlatched, or tripped, state.

According to another embodiment, the above-described reset arrangement can be incorporated in a GFCI-protected receptacle that also has load terminals for supplying power to downstream devices. For example, such an alternative embodiment is readily accomplished by providing an additional set of phase and neutral contacts at the ends of additional respective cantilevered load-side contact arms, which connect to load terminals, such as terminal screws or push-in contact holes, as described above in regard to line side terminals. In an exemplary arrangement, one such load contact is positioned below movable line contact 102 on the phase side of the device, and the other load contact is positioned below movable line contact 104, on the neutral side of the device. With the receptacle in the tripped or unlatched state, all contacts on each side (phase and neutral) are electrically isolated. During the reset operation the movable load contacts rise first, by movable contact carriage 106, and engage their respective line contacts 102, 104, which then rise to engage their respective fixed (face-connected) contacts 122, 124. Alternatively, the positions of the movable load and line contacts could be reversed.

A receptacle according to aspects of the invention also includes components for testing the GFCI circuitry and permanently denying power to the face terminals and to the load terminals, if so equipped, when a malfunction is detected. The arrangement according to one embodiment utilizes a two-stage switch, actuated by pressing the test button, which is functionally similar to a switch disclosed in U.S. Pat. No. 6,697,238 to Bonilla, et al., which issued on Feb. 24, 2004 and which is incorporated herein by reference in its entirety. The first stage of the test switch closes primary contacts that cause the GFCI supervisory circuit to simulate a ground fault. If the device malfunctions, for example, it does not trip/unlatch by energizing the solenoid, continued pressing of the test button invokes the second stage, which closes secondary contacts in a simple circuit that energizes the solenoid to trip and unlatch the device and blow a fuse to permanently disable the device (an end-of-life condition).

Figure 4:
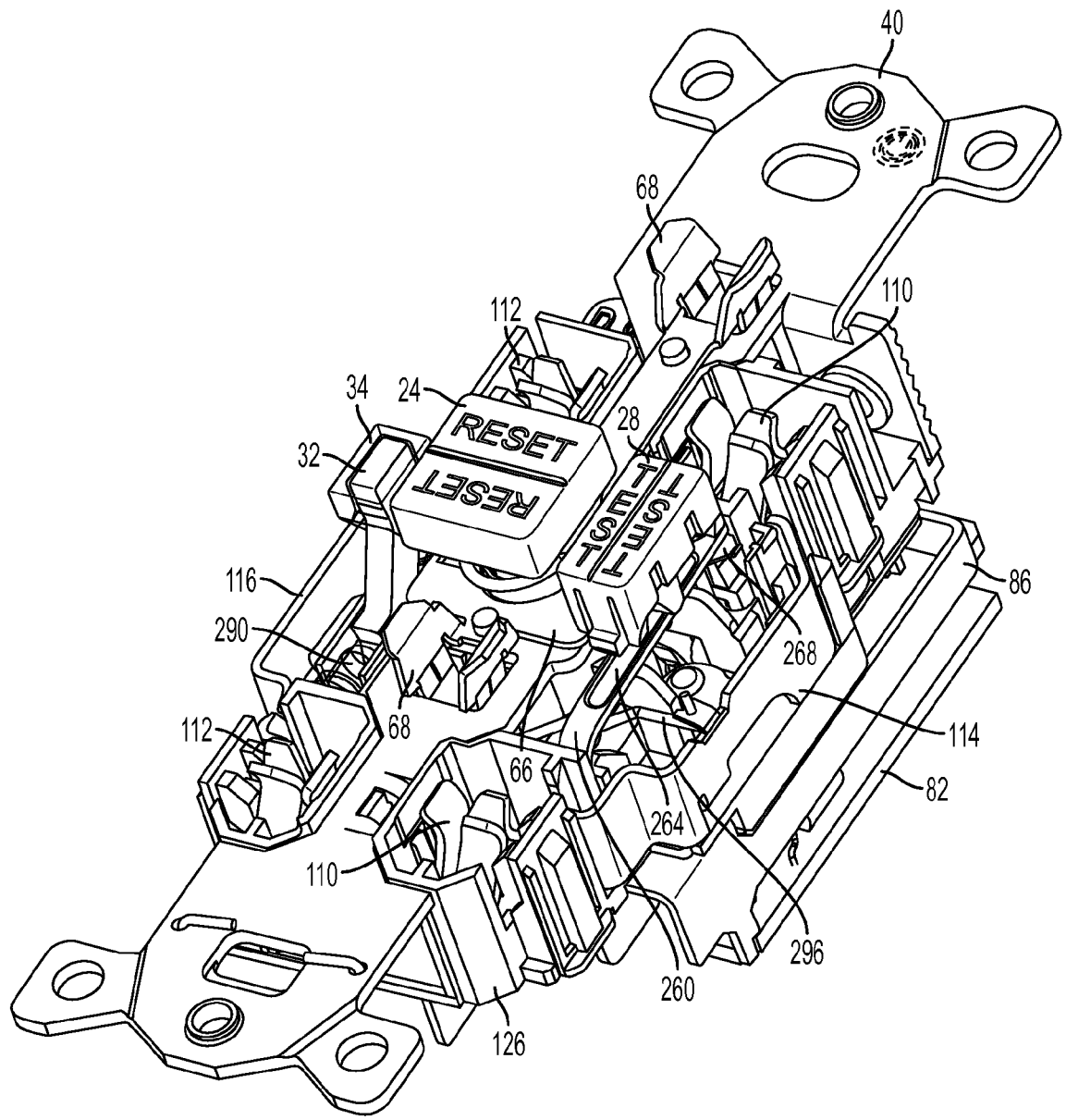
FIG. 4 is a front perspective view of the receptacle of FIG. 1, with the front and rear covers and tamper-resistant mechanisms removed.
Figure 9:
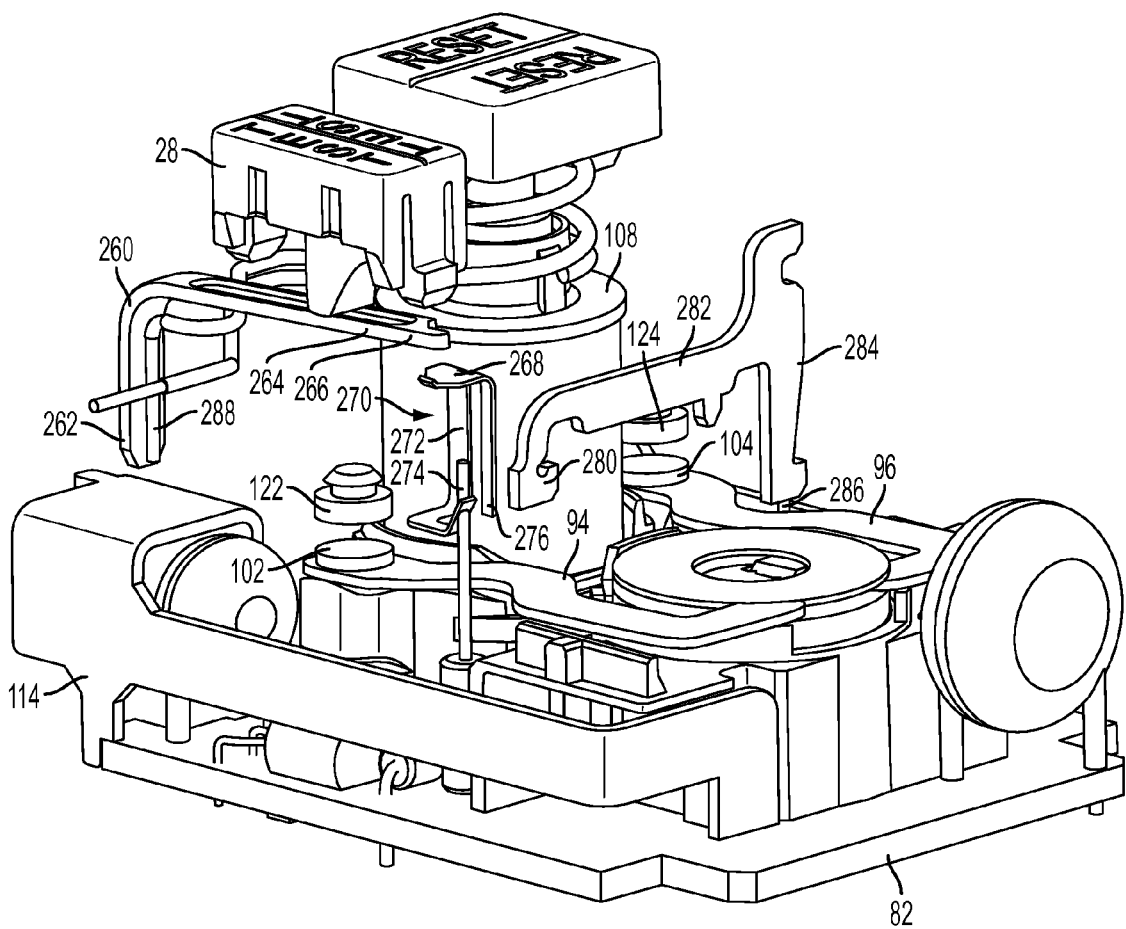
FIG. 9 is a front perspective view similar to FIG. 7 with test and reset buttons and other components added.

Referring to FIGS. 4, 8 and 9, vertically movable test button 28 is disposed above L-shaped conductive spring arm 260, the lower (vertical) leg 262 of which is anchored in a recess in separator manifold 126. The upper (horizontal) leg 264 of spring arm 260 is cantilevered with its free, distal, end 266 disposed above the top 268 of a rocker contact 270. One leg 272 of rocker contact 270 is supported on a lead 274 of a resistor mounted on circuit board 82. The other leg 276 of rocker contact 270 is disposed adjacent one end 280 of a test jumper 282, which is supported at its other end 284 on another resistor lead 286. A test jumper wire 288 electrically connects spring arm 260 to neutral bus bar 116.

When test button 28 is pressed, the distal end 266 of spring arm 260 makes contact with the top 268 of rocker contact 270, closing the test circuit, e.g., to simulate a fault, as described in more detail below. If the device malfunctions, i.e., does not trip/unlatch by energizing the solenoid, continued pressing of the test button causes leg 276 of rocker contact 270 to swing out and contact the end 280 of test jumper 282. When this occurs, both inner and outer coils 140, 142 of solenoid 108 are energized to trip and unlatch the device. Further, under this condition, an open circuit is generated, such as by blowing a fuse, to permanently disable the device. According to one aspect of this exemplary embodiment, an end-of-life indicator, such as a red LED on circuit board 82, is activated to indicate the end-of-life status. The glow of the red end-of-life LED is visible on the face 14 through outer light pipe 34 (see FIGS. 1, 3, 4 and 5).

Tripping the GFCI Device

Figure 23:
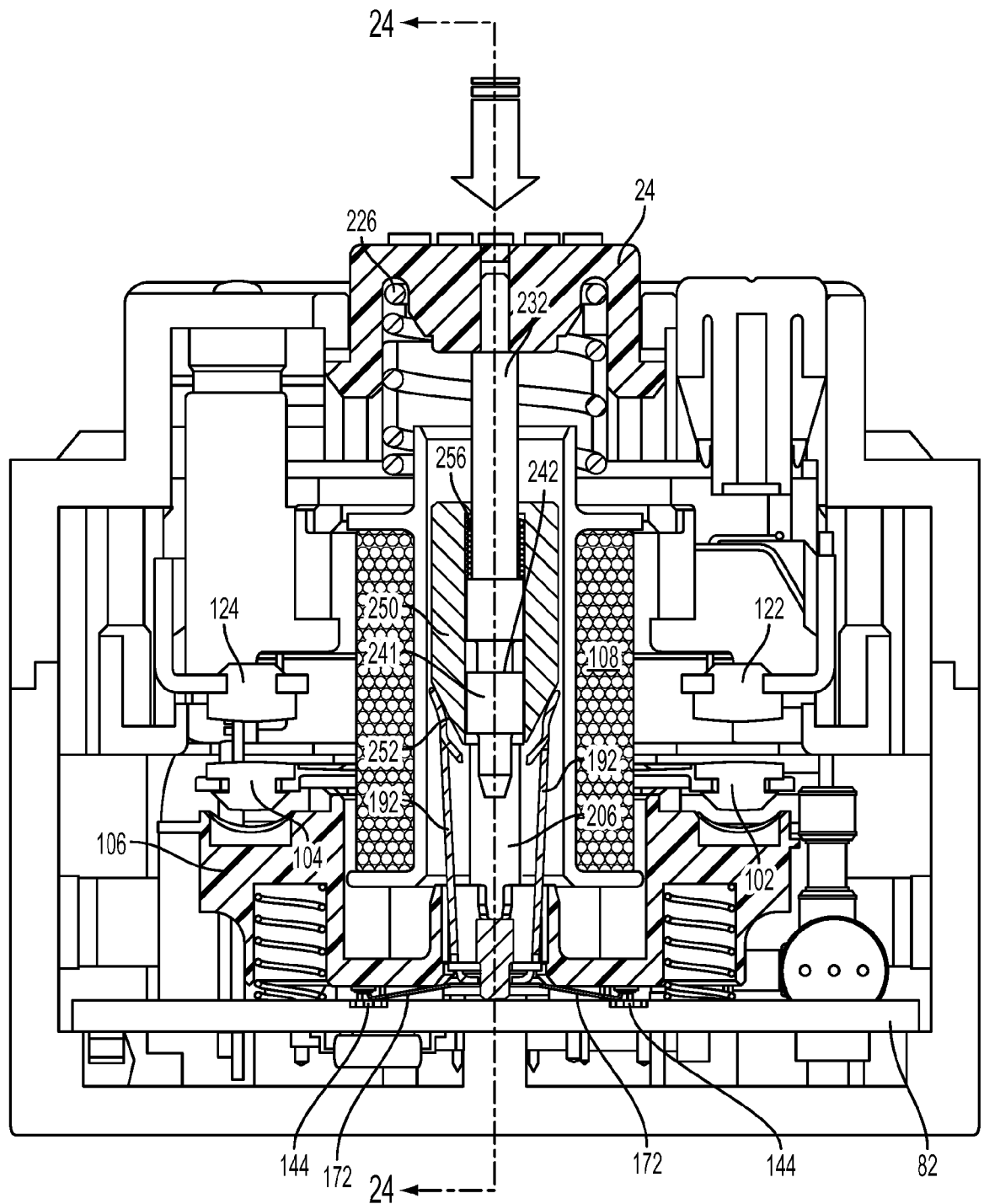
Figure 24:
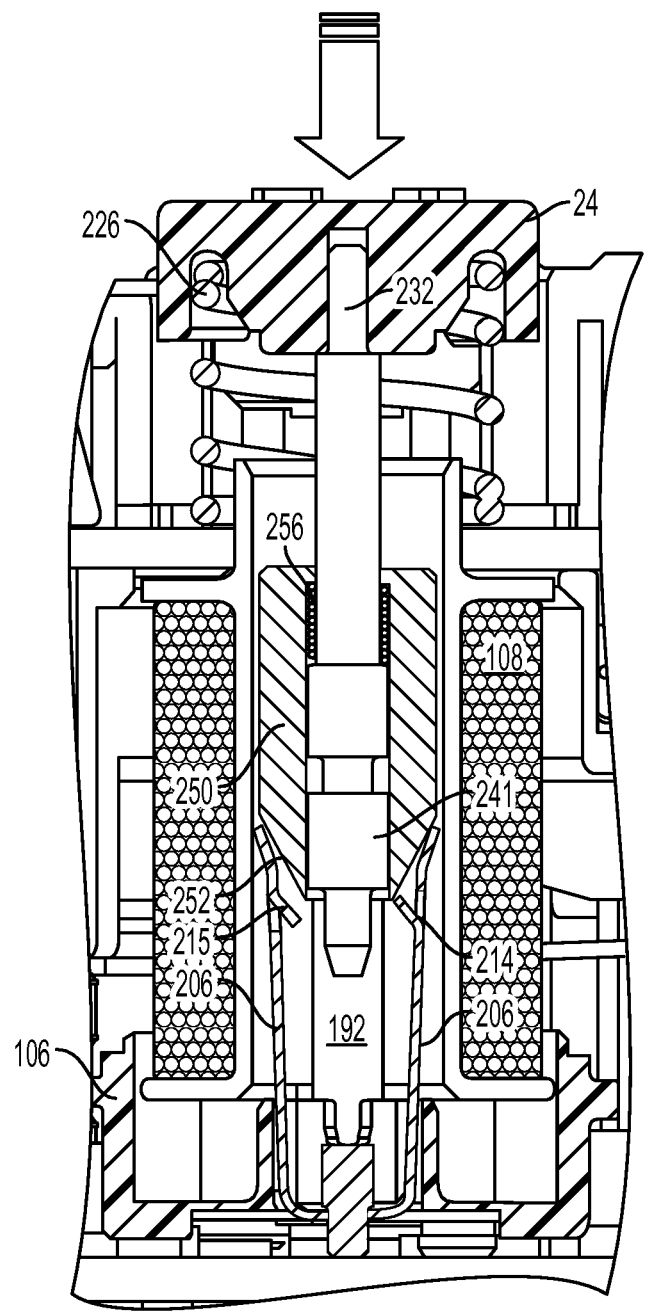
FIG. 24 is a front elevational view in cross-section of the state of the latching components shown in FIG. 23 taken along line 23-23.
Figure 26:
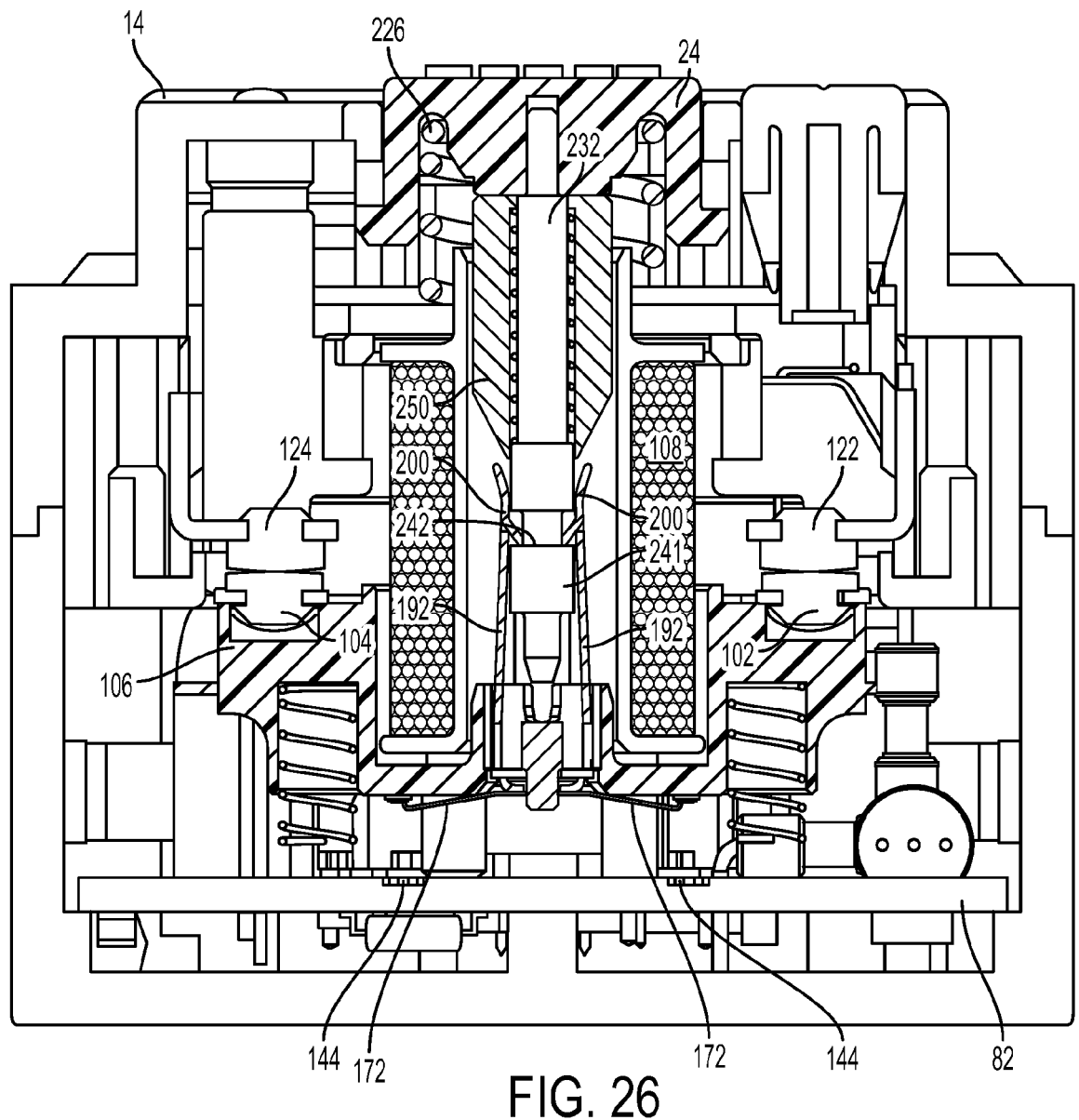

Tripping, or unlatching, the device and, thus, opening contacts 102, 122 and 104, 124, will now be described with reference to FIGS. 20, 23 and 26. FIG. 26, for example, illustrates the major components of a GFCI device in accordance with embodiments of the invention. More particularly, FIG. 26 illustrates the latching components in the fully reset state, i.e., with the line and face contacts electrically connected. When solenoid 108 is momentarily energized by one or more of a detected fault, a simulated fault or as a result of another test, or by the fail-safe circuit during testing as a result of an end-of-life condition, a magnetic field is generated and solenoid armature 250 is biased or pulled, e.g., downward in FIG. 23, thus, spreading apart latch beams 192 and reset beams 206 (see also FIG. 23). This action frees latch tabs 200 from upper shoulder 242 of reset plunger 232, thus, unlatching carriage 106 and allowing reset spring 226 to raise reset plunger 232 by pushing upward against reset button 24. Carriage 106 is now free to move and drops due to the natural downward bias of contact arms 94, 96 with movable contacts 102, 104 which rest within recesses 162, 164 (see FIG. 13). When movable contacts 102, 104 move downward, they separate from their respective fixed (face) contacts 122, 124. FIG. 20 illustrates the mechanism shown in FIG. 23 in the final unlatched, tripped, state with carriage 106, including contacts 172, supported above the circuit board and contact pads 144 by coil springs 182. In this state, reset button 24 is in its highest position relative to the front face of the device housing.

The Power-On Status Indicator

A power-On status indicator in the form of a green LED 290 (see FIG. 8) is visible on face 14 through inner light pipe 32 (see FIGS. 1, 3, 4 and 5). LED 290 is mounted on a mini-PCB 292, and is electrically connected to neutral bus bar 116 by its lead 294 and electrically connected to phase bus bar 114 by a jumper 296. Further details of the operation of the power-on status indicator are provided below in reference to FIG. 27.

Figure 27:
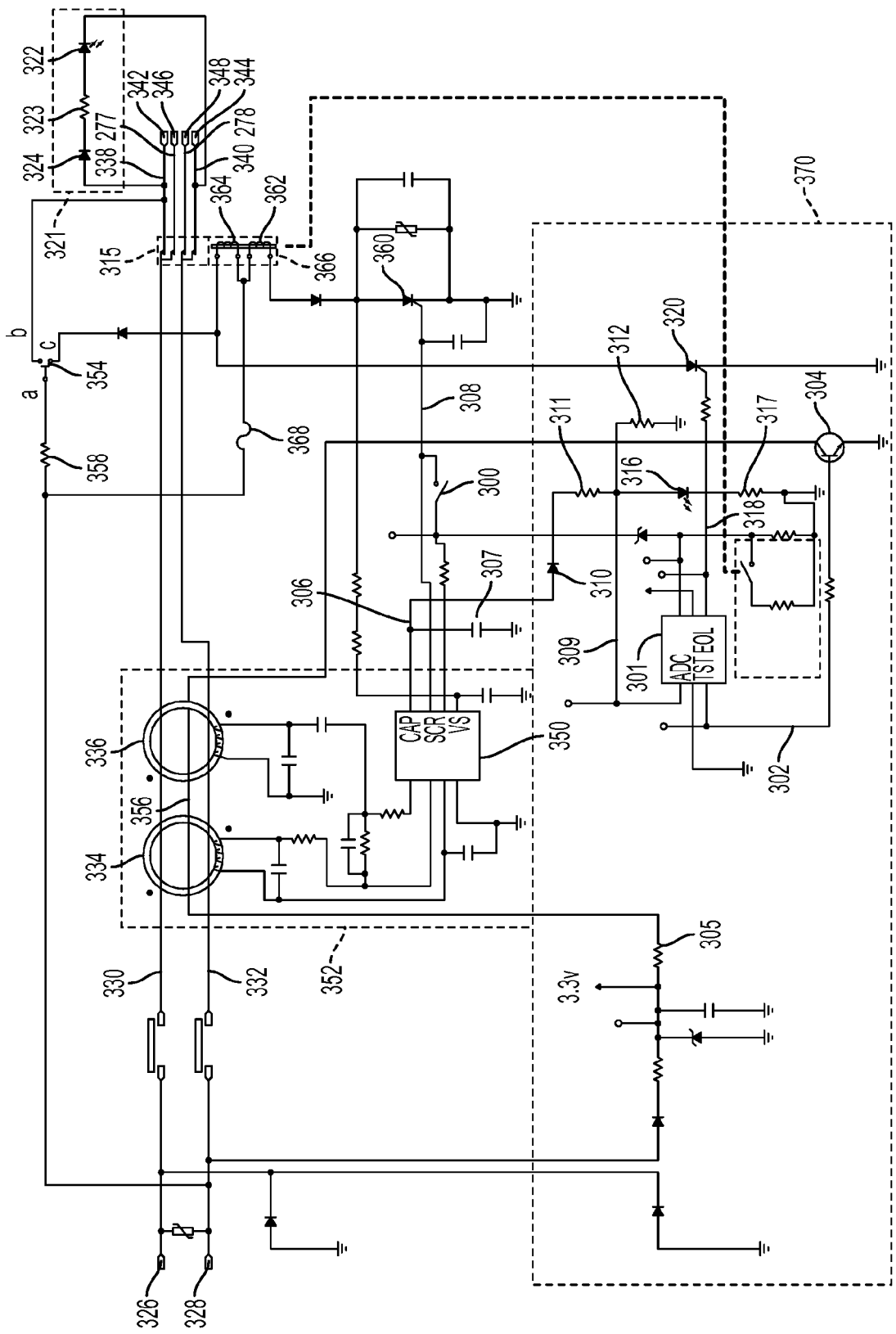
FIG. 27 is a schematic diagram of an exemplary circuit that may be employed in the receptacle of FIG. 1.

FIG. 27 is a schematic of an electrical circuit consistent with one or more of the exemplary embodiments of the present invention described above. More particularly, the circuit shown in FIG. 27 can be employed in a GFCI device as described above with respect to various embodiments of the invention. The circuit shown in FIG. 27 is consistent with the mechanical operation of the invention described above; however, a GFCI device consistent with the invention need not employ the precise electrical circuit depicted in FIG. 27 and those of ordinary skill in the art, after viewing FIG. 27 and/or reviewing the description set forth below, would be able to modify certain aspects of the circuit to achieve the same or similar results. Such modifications are contemplated and believed to be within the scope of the invention set forth herein.

Referring to FIG. 27, an electrical circuit consistent with the operation of the present invention includes phase line terminal 326 and neutral line terminal 328 for electrical connection to an AC power source (not shown). Phase conductor 330 and neutral conductor 332 are respectively connected to the phase and neutral line terminals and each pass through sense transformer 334 and grounded neutral transformer 336, which are part of a detection circuit described below. By way of example, phase and neutral line conductors 330, 332 represent line contact arms 94, 96, respectively, as described above with respect to one exemplary embodiment of the invention. Line conductors 330, 332 are each cantilevered with respective fixed ends connected to the line terminals and each includes a respective movable contact, e.g. contacts 102, 104 from the embodiment described above. Face phase and face neutral conductors 338, 340, respectively, include electrical contacts, for example contacts 122, 124 in the embodiment above, fixed thereto. The face conductors are electrically connected to and, in the embodiment shown are integral with, respective face terminals 342, 344, to which plug blades would be connected when the electrical receptacle device is in use.

The circuit shown in FIG. 27 also includes optional load phase and load neutral terminals 346, 348, which electrically connect to a downstream load, such as one or more additional receptacle devices. Load terminals 346, 348, when included, are respectively connected to cantilevered load conductors 277, 278, each of which includes a movable contact (not shown) at its distal end. The load contacts are disposed between respective phase and neutral line contacts and phase and neutral face contacts and are coaxial with them such that when one of the pairs of conductors, i.e., line or load, is moved toward the other, i.e., load or line, and the face conductors, the three sets of contacts will mate and be electrically connected together, e.g., in the reset state described above.

The Detector Circuit

A detector circuit 352 includes transformers 334, 336 as well as a GFCI integrated circuit device (GFCI IC), 350. GFCI IC 350 can be one of an RV4141 or RV4145 device, both made by Fairchild Semiconductor Corporation, a Fudan FM2141 device, a Crys-Lattice CL4141 device, or it can be a custom device or circuit. GFCI IC 350 receives electrical signals from transformers 334, 336 and determines if one or more faults, either real or simulated, has occurred. For example, when a current imbalance in line conductors 330, 332 occurs, a net current flows through the transformers which causes a magnetic flux to be created about the transformers. This flux results in current on the wires connecting the transformers to GFCI IC 350 and a signal is, thus, provided to GFCI IC 350, which generates a detection signal on one or more of its outputs, such as the SCR output.

The current imbalance on line conductors 330, 332 results from either a real ground fault or a test ground fault. A test, or simulated, ground fault is generated by pressing the test switch 354, e.g., test button 28 described in the embodiments above regarding the mechanical structure and operation of the invention. As described in further detail below, another condition that causes a flux to be generated at one or more of the transformers and, thus, the detection signal to be generated by the GFCI IC, is when the auto-monitoring circuit 370 initiates an auto-monitoring test sequence that includes a current generated on independent conductor 356.

According to one embodiment, test switch 354 is a two-stage switch where upon initial activation, or pressing by a user, contacts "a" and "b" are electrically connected. This results in some of the current flowing in line conductors 330, 332 to be diverted around sense transformer 334 and through resistor 358 to the face conductors. By diverting some of the current through resistor 358, an imbalance is caused in the current flowing in one direction through conductor 330 and the current flowing in the opposite direction through conductor 332. This current imbalance, i.e., net current, is detected by circuit 352 and SCR output of GFCI IC 350 is activated.

When the SCR output is activated it turns ON the gate of SCR 360 allowing current to flow through fuse 368 and trip coil 362 of solenoid 366. The current flowing through trip coil 362 generates a magnetic field that moves an armature within the solenoid, e.g., similar to the action of armature 250 within solenoid 108 described above. When the solenoid armature moves, it unlatches a contact carriage, such as carriage 106 in the embodiment above, and the carriage drops under the natural bias of the line conductors away from the face conductors and the optional load conductors, if included. The device is now said to be "tripped," as a result of the successful manual test sequence, and the device is ready to be reset. The time it takes from the moment contacts "a" and "b" of test switch 354 connect until the device is tripped and current no longer flows, particularly through fuse 368 and trip coil 362, is so short that fuse 368 remains intact.

If, however, the latching mechanism fails to trip and the line and face (and possibly load) contacts are not separated when test button 354 is initially pressed, continued pressing of switch 354 results in contacts "a" and "b" becoming disconnected and contacts "a" and "c" being connected. When this occurs, current flows from neutral conductor 332 through resistor 358 and through both coils of solenoid 366, i.e., fail safe coil 364 and trip coil 362. Further, some of the current continues to flow through fuse 368 resulting in its destruction and an open circuit results where fuse 368 was previously. According to this exemplary embodiment, coils 362 and 364 are concentric and the current now flowing through both coils results in a stronger magnetic field within the solenoid 366. This stronger magnetic field is generated in a final attempt to trip the device and separate the line contacts from the face contacts, that is, the contacts that failed to disengage normally when the test button 354 was initially pressed.

Manual Testing Via the Reset Operation

With continued reference to FIG. 27, as described above with respect to the mechanical aspects of the invention, closing the reset switch 300, e.g., by pressing reset button 24 as described with respect to the above embodiments, also initiates a test operation. Specifically, when reset switch 300 is closed, a voltage supply output, VS, of GFCI IC 350 is electrically connected to the gate of SCR 360 through conductor 308, thus, turning the SCR ON and drawing current from line conductor 332 through fuse 368, trip coil 362 and SCR 360 and ultimately to ground. The current flowing through coil 362 generates a magnetic field in solenoid 366 and the armature within the solenoid is actuated and moves. Under typical, e.g., non-test, conditions the armature is actuated in this manner to trip the device, such as when an actual fault or a manual ground fault via the test button occurs.

In this particular situation, however, the device is already in the tripped condition, i.e., the line and face (and possibly load) contacts are electrically isolated. In this situation the reset button was most likely pressed to re-latch the contact carriage and bring the line and face contacts back into electrical contact. This reset operation is described in detail above in regard to FIGS. 20-26. For example, the contacts on reset switch 300 in FIG. 27 correspond to contacts 172 described above. If the armature of solenoid 366 fails to fire, and the reset mechanism, including the contact carriage described above, fails to engage the reset plunger on its return after the reset button is released, the device will not be reset. Accordingly, if, for example, the device is not wired at all, or it is miswired, that is, the device is wired with the AC power not connected to the line terminals, e.g., 326, 328, no power is applied to the GFCI IC 350. If no power is applied to GFCI IC 350 it cannot drive SCR 360 and the device will not be able to be reset, as described above. Thus, the miswire condition is prevented because the device cannot be reset until AC power is properly applied to the line terminals.

The Auto-Monitoring Circuit

With continued reference to the exemplary circuit schematic shown in FIG. 27, a further aspect of the invention not previously mentioned will now be described with respect to auto-monitoring circuit 370. Auto-monitoring circuit 370 includes a programmable device 301. Programmable device 301 can be any suitable programmable device, such as a microcontroller or a microprocessor, which can be programmed to implement the auto-monitoring routine as explained in detail below. For example, programmable device 301 can be implemented by an ATMEL™ microcontroller from the ATtiny 10 family or a Microchip microcontroller such as a PIC10F204/206.

According to one exemplary auto-monitoring, or automatic self-testing, routine in accordance with this embodiment, programmable device 301 initiates the auto-monitoring routine approximately every three (3) seconds by setting an auto-monitoring test flag. The auto-monitoring test flag initiates the auto-monitoring routine on the circuit interrupting device and confirms that the device is operating properly or, under certain circumstances, determines that the circuit interrupting device has reached its end-of-life (EOL). Moreover, this automatic self-testing routine occurs on either half-cycle of the AC wave, i.e., either the positive or negative half-cycle. When the auto-monitoring routine runs with a positive result, the auto-monitoring circuit enters a hibernation state until the programmable device sets the test flag again and initiates another auto-monitoring routine.

If the auto-monitoring routine runs with a negative result, e.g., it cannot be determined that the circuit interrupting device is functioning properly, a failure counter is incremented and the programmable device initiates another auto-monitoring routine when instructed. In addition to the failure count being incremented, a temporary indication of the failure can also be provided. For example, a Light Emitting Diode (LED) may be flashed one or more times to indicate the failure to a user. If the failure counter reaches a predetermined value, i.e., the auto-monitoring routine runs with a negative result a predetermined number of times, the auto-monitoring routine invokes an end-of-life (EOL) sequence. The EOL sequence then performs one or more of the following functions; (a) indicates that EOL has been reached, for example, by continuously flashing or illuminating an indicator light and/or generating an audible sound, (b) attempts to trip the device, (c) prevents an attempt to reset the device, (d) stores the EOL event on non-volatile memory, e.g., in the event there is a power failure, and (e) clears the EOL condition when the device is powered down.

In accordance with this embodiment, when the programmable device determines it is time to run the auto-monitoring routine, a stimulus signal 302 is turned ON by programmable device 301. When the stimulus signal is turned ON, electrical current flows through resistor 303 and transistor 304 is turned ON. When transistor 304 is turned ON, current flows from the 3.3V voltage supply through resistor 305, which is, for example, a 3 k-ohm resistor, and continues through electrical conductor 356 and transistor 304 to ground. According to this exemplary embodiment, electrical conductor 356 is a wire connected at one end to resistor 305, traverses through the centers of sense transformer 334 and grounded neutral transformer 336 and is looped approximately six (6) times around the cores of these transformers and is connected at its other end to the collector-emitter of transistor 304. Thus, when the software auto-monitoring test flag is set in device 301 and transistor 304 is turned ON, current flows through conductor 356 which comprises an independent third conductor, e.g., separate from the two, hot/phase and neutral, conductors 330 and 332 that also traverse through the centers of transformers 334 and 336.

If the circuit interrupting device according to the present embodiment is functioning properly, when current flows through third conductor 356, thus creating a net current flow through the transformer, a flux is generated at the transformer which is detected by detection circuit 352, including GFCI device 350. In accordance with this embodiment, when device 350 detects the flux created at 334, a voltage level is increased at one of the output ports of device 350, for example at the output port labeled CAP in FIG. 27, thus increasing the voltage on line 306. Because conductive line 306 is connected to a capacitor, 307, the SCR trigger signal 308 of device 350 is delayed for a predetermined period of time, i.e., determined by the value of capacitor 307. For example, if capacitor 307 is a 1.8 nF capacitor and device 350 is an RV4141 device, SCR trigger signal 308 is delayed for 3.333 msec. Further, the CAP output, 306, of device 350 is connected to programmable device 301 via a path that includes conductor 309 and diode 310 in series with resistor 311, e.g., 4.7 k-Ohm, which completes a voltage divider with resistor 312, e.g., 1M-Ohm.

According to this embodiment, programmable device 301 has an analog-to-digital converter (ADC) whose input is connected to conductor 309. Accordingly, the ADC of device 301 reads the increasing voltage established on capacitor 307. When a predetermined voltage level is reached at the ADC input of programmable device 301, device 301 turns OFF the auto-monitoring stimulus signal by setting the TST output to logic low, thus, turning off transistor 304 and stopping the current flow on conductor 356 and, thus, the flux created at transformer 334. When this occurs, it is determined by programmable device 301 that a qualified auto-monitoring event has successfully passed and the auto-monitoring fail counter is decremented if the present count is greater than zero.

In other words, according to this embodiment an auto-monitoring routine is repeated by programmable device 301 on a predetermined schedule. For example, based on the software program installed within the device, the auto-monitoring routine is programmed to be run, as desired, anywhere from every few seconds to every month, etc. When the routine is initiated, the flux created at transformer 334 occurs similarly to the way a flux would be created if either an actual ground fault had occurred or if a simulated ground fault had been manually generated, e.g., by pressing the test button as described above. That is, when either an actual or simulated ground fault occurs, a difference in the current flowing in the phase and neutral conductors, 330 and 332, respectively, is created. This differential, or net, current flowing through sense transformer 334 is detected by device 350 which, as a result, drives SCR 360 to turn ON via conductor 308. When SCR 360 turns ON, current passes through trip coil 362 which trips interrupting device 315, i.e., causing the contact carriage to drop, causing the line and face (and possibly load) contacts to separate from each other. Thus, current is prevented from flowing through phase and neutral conductors 330 and 332 to the phase and neutral face terminals, 342 and 344, respectively, and the phase and neutral load terminals, 346 and 348, respectively, when external load terminals are included in the device in accordance with the alternative embodiment discussed above.

In comparison, when the auto-monitoring routine is performed in accordance with the present invention, no differential current is created on the phase and neutral conductors 330, 332 and the interrupting device 315 is not tripped. Instead, during the auto-monitoring routine, the flux generated at sense transformer 334 is a result of current flowing through a single, independent third, conductor 356, electrically isolated from phase and neutral conductors 334, 336. The current generated on conductor 356 is present for only a brief period of time, for example, less than the delay time established by capacitor 307, discussed previously.

Thus, if the voltage on conductor 309 and input to the ADC input of programmable device 301 reaches a given voltage within this predetermined period of time during an auto-monitoring routine, it is determined that the detection circuit 352 successfully detected the net current flowing in sense transformer 334 and the auto-monitoring event has passed. Accordingly, programmable device 301 determines that detection circuit 352, including GFCI device 350, is working properly. Because the net current flowing through sense transformer 334 during the auto-monitoring routine is designed to be substantially similar in magnitude to the differential current flowing through the transformer during a simulated ground fault, e.g., 4-6 milliamps, it is determined that detection circuit 352 would be able to detect an actual ground fault and provide the proper drive signal to SCR 360 to trip interrupter 315.

Alternatively, the auto-monitoring circuit 370 might determine that the auto-monitoring routine has failed. For example, if it takes longer than the predetermined period of time for the voltage at the ADC input of programmable device 301 to reach the given voltage during the auto-monitoring routine, it is determined that the auto-monitoring event failed. If this occurs, an auto-monitoring fail tally is incremented and the failure is indicated either visually or audibly. For example, according to one embodiment, the ADC port of programmable device 301 is converted to an output port when an auto-monitoring event failure occurs and a voltage is placed on conductor 309 via the converted I/O port, generating a current to flow on conductor 309, through indicator LED 316 and resistor 317 to ground. Subsequently, the ADC I/O port of programmable device 301 is converted back to an input for the next scheduled auto-monitoring event.

For example, when an auto-monitoring event failure occurs, indicator LED 316 illuminates only for the period of time when the I/O port is converted to an output and an output voltage is generated at that port; otherwise LED 316 remains dark, or non-illuminated. Thus, if the auto-monitoring routine is run, for example, every three (3) seconds, and an event failure occurs only a single time or sporadically, the event is likely to go unnoticed by the user. If, on the other hand, the failure occurs regularly, as would be the case if one or more of the components used in the auto-monitoring routine is permanently disabled, the indicator LED 316 would blink at a regular interval, thus drawing attention to the device and informing the user that critical functionality of the device has been compromised. Conditions that cause the auto-monitoring routine to fail include one or more of the following, open circuited differential transformer, closed circuited differential transformer, no power to the GFCI IC, open circuited solenoid, SCR trigger output of the GFCI IC continuously high, and SCR output of the GFCI IC continuously low.

According to a further aspect of this embodiment, if the auto-monitoring fail tally reaches a predetermined limit, for example, seven (7) failures within one (1) minute, programmable device 301 enters an end-of-life (EOL) state. If this occurs, an audible or visual indicator is activated to alert the user that the circuit interrupting device has reached the end of its useful life. For example, when an EOL state is determined, the ADC I/O port of programmable device 301 is converted to an output port, similar to when a single failure is recorded as described above, and a signal is either periodically placed on conductor 309 via the ADC output port, i.e., to blink LED 316, or a signal is continuously placed on conductor 309 to permanently illuminate LED 316. The auto-monitoring routine is also halted at this time.

Additionally, according to a further embodiment, when EOL is determined, programmable device 301 attempts to trip interrupting device 315 in one or both of the following ways: (a) by maintaining the stimulus signal on third conductor 356 into the firing half-cycle of the AC wave, and/or, (b) by converting the EOL port of programmable device 301 to an output, if it is currently an input port, and placing a drive signal on conductor 318 to directly drive the gate of SCR 320 to turn SCR 320 ON, thus, enabling it to conduct current and activate the solenoid. More specifically, when SCR 320 is turned ON, current is drawn through fail safe coil 364 of dual coil solenoid 366. For example, dual coil solenoid 366 includes inner fail safe coil 364, which comprises a 300 turn, 10 Ohm, coil, and outer main, trip, coil 362, which comprises an 880 turn, 25.5 Ohm, coil.

Accordingly, when it is determined via the auto-monitoring routine that detection circuit 352 is not successfully detecting ground faults, e.g., it does not detect the flux resulting from current flowing in conductor 356, or that it is not otherwise generating a drive signal on conductor 308 to drive SCR 360 upon such detection, programmable device 301 determines EOL and attempts to trip interrupting device 315 by one or both of two separate methods. Specifically, device 301 attempts to directly trip interrupting device 315 by either, (a) continuing to generate the signal on conductor 356, or, (b) directly driving the fail safe coil 364, or, both, (a) and (b). There is one significant difference, however, between the signal on conductor 356 when the auto-monitoring routine is being run normally, and the signal on conductor 356 that is generated when EOL is determined. That is, under EOL conditions, the signal, e.g., electrical pulse, on conductor 356 is extended into, or otherwise generated in, the firing half-cycle of the AC wave. This should generate flux at transformer 334 which, assuming all else is working properly, causes SCR 360 to be triggered and trip coil 362 to be energized, thus activating the solenoid to trip the interrupting device 315.

When the second method (b) above, is employed, that is, SCR 320 is driven to draw current through fail safe coil 364 to trip interrupting device 315, the current is first drawn through fuse 368, which may comprise a regular fuse, a fusible resistor or any other fusible element, such as a drip of solder. If interrupting device 315 fails to open and, in particular, open in a very short amount of time, the current being drawn through fuse 368 will destroy the fuse, i.e., cause an open-circuit, and the current will no longer flow, leaving no further opportunities for the programmable device 301 to trip interrupting device 315.

If both methods (a) and (b) above are employed for tripping interrupting device 315 in the event of an EOL condition, both coils, 362, 364 of dual coil solenoid 366 are energized. Further, if either of the two methods, (a) and (b), successfully opens interrupting device 315, or if interrupting device was otherwise already open, power-on indicator circuit 321 will be OFF. For example, in the embodiment shown in FIG. 27, power on indicator circuit includes LED 322 in series with resistor 323 and diode 324. One lead of LED 322 is connected to the neutral face terminal 344 and one lead of diode 324 is connected to phase face terminal 342. Accordingly, when power is available at the face terminals, current is drawn through the power on circuit on each alternating half-cycle of AC power, thus, making LED 322 blink. If, on the other hand, power is not available at the face terminals 342, 344, for example, because interrupting device 315 is open, or tripped, then LED 322 will be dark, or not illuminated.

Additional embodiments and aspects thereof, related to the auto-monitoring functionality consistent with the present invention, as well as further discussion of some of the aspects already described, are provided below.

For example, the sinusoidal AC waveform includes two half-cycles, a positive half-cycle and a negative half-cycle. The so-called firing half-cycle refers to the particular half-cycle, either positive or negative, during which a gate trigger signal to an SCR, for example SCR 360 and/or SCR 320, results in the respective solenoid coil conducting current and the solenoid firing, e.g., where the armature moves. A non-firing half-cycle refers to the alternate half-cycle of the AC waveform, i.e., either negative or positive, where current does not flow through an SCR or its respective solenoid coil, regardless of whether or not the SCR gate is triggered. Whether the positive or negative half-cycle is the firing half-cycle is typically determined by a diode placed in series with the respective solenoid coil.

Under optimal conditions the auto-monitoring routine consistent with embodiments of the invention can be performed at any time within a given AC cycle, that is, during either the positive or negative (firing or non-firing) half-cycle. Of course, it would be ideal if the auto-monitoring routine could be completed entirely during the non-firing half-cycle, so that any unintentional firing of the solenoid, for example, due to inadvertent SCR triggering, is avoided. Such an ideal situation may not be possible, however, due to, for example, inadequate voltage sampling times by the programmable device, how the circuit is configured, and/or how the GFCI device is powered.

One unfavorable scenario occurs when the auto-monitoring routine is performed only during the firing half-cycle of the solenoid. Accordingly, the programmable device according to at least one exemplary embodiment of the present invention is able to turn ON the test current, e.g., on independent, third, line 356, sample a voltage level, e.g., at the ADC input of device 301, make a determination whether the routine has passed, and then turn OFF the test current, all within a very small time period so as not to trigger the SCR during a firing half-cycle. The auto-monitoring circuit according to this embodiment, e.g., circuit 370, operates in this condition and as such one auto-monitoring event is completed within 250 microseconds.

According to a further embodiment of a circuit interrupting device consistent with the invention, programmable device 301 also can optionally monitor the AC power input to the device. For example, the device can monitor the 60 Hz AC input that is electrically connected to the phase and neutral line terminals 326, 328.

A full AC cycle at 60 Hz takes approximately 16.333 milliseconds to complete. Thus, to monitor and confirm receipt and stabilization of the AC waveform, a timer/counter within programmable device 301 is implemented. For example, within a 100 millisecond window there should be at least 6 positive transitions of a 60 Hz signal. However, because AC frequencies may fluctuate at 60 Hz, the qualifying event count, e.g., to determine that AC power has been applied to the device, is set to less than 6 such transitions, for example, 3 positive transitions. Accordingly, the situation is accommodated where a circuit interrupting device in accordance with the invention is connected to a variable power source, such as a portable generator, that exhibits a lower frequency at start-up and requires a stabilization period before the optimal frequency, e.g., 60 Hz, is achieved.

Further, to confirm that the applied AC power waveform has stabilized at the optimal frequency, programmable device 301 counts the number of positive transitions repetitively occurring within a given period, for example 6 transitions within a 100 millisecond period. If the frequency is not stabilized at the optimal frequency, or at least not within an acceptable range, the initiation of the auto-monitoring routine is delayed until the frequency is stabilized. If the frequency does not achieve the optimal frequency, or a frequency within an acceptable range, within a predetermined time, a fail tally is incremented. Similar to the fail tally discussed previously with respect to the auto-monitoring routine, if the tally reaches a given threshold, the programmable device 301 can declare EOL.

As described above, according to at least one exemplary embodiment, programmable device 301 is implemented in a microprocessor. Because some microprocessors include non-volatile memory, e.g., for storing various data, etc., in the event of a power outage, according to a further embodiment all events, timers, tallies and/or states within the non-volatile memory are cleared upon power-up of the device. Accordingly, if the fail tally or other condition resulted from improper device installation, inadequate or improper power, or some other non-fatal condition with respect to the circuit interrupting device itself, the fail tally would be reset on power-up, when the tally incrementing event may no longer be preset. Of course, another way of avoiding this potential issue is to utilize a programmable device that does not have non-volatile memory.

While various embodiments have been chosen to illustrate the invention, it will be understood by those skilled in the art that other modifications may be made without departing from the scope of the invention as defined by the appended claims. Several possible modifications are mentioned below by way of example only.

The reset switch may take forms other than two contact pads 144 on the circuit board and a bridging contact 172 on the carriage. For example, the reset switch could comprise a single contact on the circuit board closable with a single contact on the underside of the carriage, which could be connected to another part of the circuit by a flexible jumper wire. Alternatively, the reset switch could be a self-contained momentary switch mounted on or beneath the circuit board and having a protruding stem that would be depressed by the carriage near the end of its downward travel. Another alternative could be a proximity switch mounted on the circuit board that would close when the carriage comes within triggering range of the switch.

The latching mechanism could take forms other than a shouldered collar 241 on the reset plunger and resilient, shouldered latch beams 192 and reset beams 206 on the carriage. For example, shouldered resilient beams or their equivalents could be located on the reset plunger and mating fixed shoulders could be located on the carriage latching portion, with the armature modified to retract the resilient beams as it moves downward. Alternatively, the reset plunger could be made hollow so that the armature moves within it to retract plunger-mounted latching elements, rather than vice versa. Other suitable variations will be apparent to those skilled in the art.

What is claimed is:

1. Resettable switching apparatus, comprising:
   a solenoid having a central axis, a first end and a second end opposite the first end;
   two sets of contacts, each set of contacts comprising a fixed contact and at least one movable contact biased away from the fixed contact;
   a carriage movable axially of the solenoid, the carriage having a latching portion extending into the solenoid through the first end thereof and axially movable therein, and external portions adapted to advance the movable contacts into engagement with their respective fixed contacts during resetting of the apparatus;
   a reset plunger extending into the solenoid through the second end thereof, movable axially therein, and biased toward a rest position away from said carriage latching portion;
   an armature movable axially of the solenoid and biased toward a rest position away from said latching portion of said carriage; and
   a solenoid activation circuit for momentarily energizing the solenoid, said circuit including a normally open reset switch closable in response to inward pushing movement of said reset plunger,
   wherein said reset plunger comprises an inner end portion adapted to engage said carriage latching portion in an unlatched pushing state in which pressing of said reset plunger pushes said carriage outward at least until the solenoid is momentarily energized, and subsequently in a latched pulling state in which said reset plunger, when released, pulls said carriage inward to close said two sets of contacts, and
   wherein said armature is adapted to enable shifting of the state of engagement of said reset plunger with said carriage latching portion from said unlatched pushing state to said latched pulling state in response to closing of said reset switch and resulting activation of the solenoid.

2. Resettable switching apparatus according to claim 1, wherein said reset plunger inner end portion comprises a pushing surface and a substantially oppositely directed pulling surface,
   wherein said carriage latching portion comprises a pushing surface and a substantially oppositely directed pulling surface,
   wherein, when the apparatus is in the unlatched state, said pulling surfaces of said reset plunger and said carriage latching portion do not mutually face one another, and said pushing surfaces of said reset plunger and said carriage latching portion do mutually face one another whereby inward pushing movement of said reset plunger is transmitted through said pushing surfaces to said carriage to move it outward at least until the solenoid is momentarily energized, and
   wherein movement of said armature enables relative shifting of at least said pulling surfaces whereby, when the apparatus is in the latched state, said pulling surfaces of said reset plunger and said carriage latching portion mutually face one another so that outwardly biased pulling movement of said reset plunger is transmitted through said pulling surfaces to said carriage to move it inward to close said two sets of contacts.

3. Resettable switching apparatus according to claim 2, wherein said reset plunger pushing surface is closer to the inner end thereof than said reset plunger pulling surface.

4. Resettable switching apparatus according to claim 3, wherein said armature has an inner end portion that is configured to engage said carriage latching portion and to thereby enable shifting from the unlatched state to the latched state.

5. Resettable switching apparatus according to claim 4, wherein said pushing surface of said carriage latching portion is on at least one resilient activation member, wherein said pulling surface of said carriage latching portion is on at least one resilient latch member, and wherein said activation member and said latch member are transversely displaceable by said armature when the solenoid is energized during reset to permit the pushing and pulling surfaces of said reset plunger to axially bypass the respective pushing and pulling surfaces of said carriage latching portion while said reset plunger is pressed.

6. Resettable switching apparatus according to claim 5, wherein the inner end portion of said armature is tapered.

7. Resettable switching apparatus according to claim 6, wherein said armature surrounds said reset plunger.

8. Resettable switching apparatus according to claim 2, wherein said sets of contacts and said external portions of said carriage are disposed alongside the solenoid.

9. Resettable switching apparatus according to claim 8, wherein said carriage has an end portion interconnecting said latching portion with said external portions thereof, and said end portion comprises at least a portion of said reset switch.

10. An alternating current (AC) receptacle comprising the resettable switching apparatus of claim 2, at least one outlet having phase and neutral face terminals, and a ground fault circuit interrupter (GFCI) for interrupting power to the face terminals when a fault condition is sensed,
    wherein said at least one movable contact of the sets of contacts are respectively connectable to the phase and neutral sides of an AC source,
    wherein said fixed contacts of the sets of contacts are respectively connected to the phase and neutral face terminals of said at least one outlet, and
    wherein the GFCI includes the solenoid, which is energized when a fault condition is sensed to cause said sets of contacts to open.

11. Resettable switching apparatus, comprising:
    a solenoid having a central axis, a first end and a second end opposite the first end;

two sets of contacts, each set of contacts comprising a fixed contact and at least one movable contact biased away from the fixed contact;

a carriage movable axially of the solenoid, the carriage having a latching portion extending into the solenoid through the first end thereof and axially movable therein, and external portions adapted to advance the movable contacts into engagement with their respective fixed contacts during resetting of the apparatus;

a reset plunger extending into the solenoid through the second end thereof, movable axially therein, and biased toward a rest position away from said latching portion of said carriage;

an armature movable axially of the solenoid independently of said reset plunger and biased toward a rest position away from said latching portion of said carriage; and a solenoid activation circuit for momentarily energizing the solenoid, said circuit including a normally open reset switch closable in response to inward movement of the reset plunger, wherein said latching portion of said carriage comprises at least one latch member having a transversely displaceable first shoulder facing away from the second end of the solenoid, wherein said armature has a tapered inner end portion that deflects said first shoulder of said latch member transversely as said armature is drawn further into the solenoid, when energized, and wherein said reset plunger has an inner end portion with at least one latching shoulder facing away from the first end of the solenoid and engageable with said first shoulder of said latch member during resetting of the apparatus when the coil is no longer energized.

12. Resettable switching apparatus according to claim 11, wherein said sets of contacts and said external portions of said carriage are disposed alongside the solenoid.

13. Resettable switching apparatus according to claim 12, wherein said carriage has an end portion interconnecting said latching portion with said external portions thereof.

14. Resettable switching apparatus according to claim 13, wherein said end portion of said carriage comprises at least a portion of said reset switch.

15. Resettable switching apparatus according to claim 11, wherein said at least one latch member of said latching portion of said carriage comprises a pair of opposed latch members.

16. Resettable switching apparatus according to claim 15, wherein said latch members are transversely resilient.

17. Resettable switching apparatus according to claim 15, wherein said latching portion of said carriage comprises at least one activation member having a transversely displaceable activation shoulder facing away from the first end of the solenoid, and the inner end portion of said reset plunger has a pressing shoulder facing away from the second end of the solenoid and engageable with said activation shoulder during resetting of the apparatus until said armature deflects said pressing shoulder out of engagement therewith.

18. Resettable switching apparatus according to claim 17, wherein said at least one latch member comprises a third latch member opposed to said at least one activation member.

19. Resettable switching apparatus according to claim 17, wherein said at least one activation member is transversely resilient.

20. Resettable switching apparatus according to claim 17, wherein said pressing shoulder is closer than said latching shoulder to the inner end of said reset plunger.

21. Resettable switching apparatus according to claim 11, wherein said latching portion of said carriage comprises at least one activation member having a transversely displaceable activation shoulder facing away from the first end of the solenoid, and the inner end portion of said reset plunger has a pressing shoulder facing away from the second end of the solenoid and engageable with said activation shoulder during resetting of the apparatus until said armature deflects said pressing shoulder out of engagement therewith.

22. Resettable switching apparatus according to claim 21, wherein said at least one activation member comprises a pair of opposed activation members.

23. Resettable switching apparatus according to claim 21, wherein said pressing shoulder is closer than said latching shoulder to the inner end of said reset plunger.

24. Resettable switching apparatus according to claim 23, wherein said pressing shoulder and said latching shoulder are annular.

25. Resettable switching apparatus according to claim 23, wherein said carriage has an end portion interconnecting said latching portion with said external portions thereof, and said end portion comprises at least a portion of said reset switch.

26. Resettable switching apparatus according to claim 21, wherein said at least one latch member and said at least one activation member are transversely resilient.

27. Resettable switching apparatus according to claim 11, wherein said at least one latch member is transversely resilient.

28. Resettable switching apparatus according to claim 11, wherein said armature surrounds said reset plunger.

29. An alternating current (AC) receptacle comprising the resettable switching apparatus of claim 11, at least one outlet having phase and neutral face terminals, and a ground fault circuit interrupter (GFCI) for interrupting power to the face terminals when a fault condition is sensed, wherein said at least one movable contact of the sets of contacts are respectively connectable to the phase and neutral sides of an AC source, wherein said fixed contacts of the sets of contacts are respectively connected to the phase and neutral face terminals of said at least one outlet, and wherein the GFCI includes the solenoid, which is energized when a fault condition is sensed to cause said sets of contacts to open.

30. Resettable switching apparatus, comprising:

a solenoid having a central axis, a first end and a second end opposite the first end;

two sets of main contacts, each set of main contacts comprising a fixed main contact and at least one movable main contact biased away from the fixed main contact;

a reset circuit for energizing the solenoid, said reset circuit including a normally open reset switch having at least one reset switch component spaced axially from said first end of said solenoid;

a carriage movable axially of the solenoid responsive to energizing thereof and adapted to advance the movable main contacts into engagement with their respective fixed main contacts during resetting of the apparatus, said carriage having a main portion disposed between said first end of said solenoid and said at least one reset switch component and adapted to close said reset switch when proximate said at least one reset switch component; and a reset actuator having a movable carriage-contacting member adapted to move said carriage toward said at least one reset switch component at least until said main portion of said carriage closes said reset switch to energize the solenoid.

31. Resettable switching apparatus according to claim 30, wherein said main portion of said carriage comprises a portion of said reset switch.

32. Resettable switching apparatus according to claim 31, wherein said at least one reset switch component comprises a pair of reset switch contacts, and said main portion of said carriage comprises a bridging contact adapted to electrically connect said pair of reset switch contacts.

33. Resettable switching apparatus according to claim 32, wherein said pair of reset switch contacts is disposed on a circuit board to which the solenoid is mounted.

34. Resettable switching apparatus according to claim 33, wherein the solenoid is mounted to the circuit board by at least one standoff which spaces the first end of the solenoid from the circuit board.

35. Resettable switching apparatus according to claim 30, wherein said at least one reset switch component is disposed on a circuit board to which the solenoid is mounted.

36. Resettable switching apparatus according to claim 35, wherein the solenoid is mounted to the circuit board by at least one standoff which spaces the first end of the solenoid from the circuit board.

37. Resettable switching apparatus according to claim 36, wherein said sets of main contacts are disposed alongside the solenoid.

38. Resettable switching apparatus according to claim 30, wherein said sets of main contacts are disposed alongside the solenoid.

39. Resettable switching apparatus according to claim 38, wherein after said reset switch is closed, said carriage is adapted to reverse direction to advance the movable main contacts into engagement with their respective fixed main contacts.

40. Resettable switching apparatus according to claim 30, wherein carriage movement toward said at least one reset switch component is opposite carriage movement to advance the movable main contacts into engagement with their respective fixed main contacts.

41. An alternating current (AC) receptacle comprising the resettable switching apparatus of claim 30, at least one outlet having phase and neutral face terminals, and a ground fault circuit interrupter (GFCI) for interrupting power to the face terminals when a fault condition is sensed,
wherein said at least one movable main contact of the sets of main contacts are respectively connectable to the phase and neutral sides of an AC source,
wherein said fixed main contacts of said sets of main contacts are respectively connected to the phase and neutral face terminals of said at least one outlet, and
wherein the GFCI includes the solenoid, which is energized when a fault condition is sensed to cause said sets of main contacts to open.

42. A circuit interrupting device comprising:
line conducting means for electrically connecting AC power to the circuit interrupting device;
face conducting means for providing external access to electric current when the circuit interrupting device is in a reset condition;
detection means for generating a detection signal when a current imbalance is detected in two line conducting members;
latch means for electrically connecting said line conducting means to said face conducting means in the reset condition and electrically isolating said line means and said face conducting means to place said circuit interrupting device in a tripped condition, wherein said latch means includes at least one pair of opposing latch beams disposed axially within a current-conducting coil;
activation means for activating said latch means when said detection signal is generated; and
drive means for directly driving said activation means to activate said latch means.

* * * * *